US012413768B2

(12) United States Patent
Hu

(10) Patent No.: US 12,413,768 B2
(45) Date of Patent: Sep. 9, 2025

(54) SELECTING A CODING METHOD FOR SUFFIX VALUES FOR DISPLACEMENT VECTOR DIFFERENCES BASED ON VALUE INTERVALS

(71) Applicant: Tencent Technology (Shenzhen) Company Limited, Guangdong (CN)

(72) Inventor: Ye Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 192 days.

(21) Appl. No.: 17/969,633

(22) Filed: Oct. 19, 2022

(65) Prior Publication Data

US 2023/0068657 A1    Mar. 2, 2023

Related U.S. Application Data

(63) Continuation of application No. PCT/CN2021/131293, filed on Nov. 17, 2021.

(30) Foreign Application Priority Data

Dec. 4, 2020    (CN) .......................... 202011414460.0

(51) Int. Cl.
*H04N 19/513*        (2014.01)
*H04N 19/184*        (2014.01)
(Continued)

(52) U.S. Cl.
CPC ......... *H04N 19/513* (2014.11); *H04N 19/184* (2014.11); *H04N 19/44* (2014.11); *H04N 19/46* (2014.11)

(58) Field of Classification Search
CPC .... H04N 19/513; H04N 19/184; H04N 19/44; H04N 19/46; H04N 19/70; H04N 19/91;
(Continued)

(56) References Cited

U.S. PATENT DOCUMENTS 8,526,495 B2    9/2013    Liu et al.
9,049,452 B2    6/2015    Liu et al.
(Continued)

FOREIGN PATENT DOCUMENTS

CN    102187672 A    9/2011
CN    106471810 A    3/2017

OTHER PUBLICATIONS

Supplementary European Search Report for 21899870, issued Jan. 2, 2024, 12 pages.

(Continued)

*Primary Examiner* — Joseph W Becker
(74) *Attorney, Agent, or Firm* — ArentFox Schiff LLP

(57) ABSTRACT

A video decoding method includes determining, from among plural value intervals, a first value interval to which an absolute value of a displacement vector difference of a current decoding unit in a first direction belongs. The method further includes determining, based on the first value interval, that the displacement vector difference in the first direction has a prefix value and a suffix value, and determining, based on the first value interval, a first suffix decoding method for decoding the suffix value. The method further includes performing decoding processing on a first suffix part in a bitstream using the determined first suffix decoding method, to obtain the suffix value corresponding to the displacement vector difference in the first direction. The method further includes determining, based on the prefix value and the suffix value, the displacement vector difference in the first direction.

20 Claims, 11 Drawing Sheets

(51) Int. Cl.
*H04N 19/44* (2014.01)
*H04N 19/46* (2014.01)

(58) Field of Classification Search
CPC ... H04N 19/593; H04N 19/139; H04N 19/517
See application file for complete search history.

(56) References Cited

U.S. PATENT DOCUMENTS

| | | |
|---|---|---|
| 10,455,231 B2 | 10/2019 | Xu et al. |
| 10,511,834 B2 | 12/2019 | Xu et al. |
| 10,542,253 B2 | 1/2020 | Liu et al. |
| 10,575,013 B2 | 2/2020 | Liu et al. |
| 10,587,881 B2 | 3/2020 | Xu et al. |
| 10,587,885 B2 | 3/2020 | Ye et al. |
| 10,666,968 B2 | 5/2020 | Xu et al. |
| 2011/0142419 A1 | 6/2011 | Zou et al. |
| 2015/0382010 A1 | 12/2015 | Rapaka et al. |
| 2017/0094271 A1 | 3/2017 | Liu et al. |

OTHER PUBLICATIONS

Office Action received for Chinese Patent Application No. 202011414460.0, mailed on Apr. 23, 2024, 17 pages (8 pages of English Translation and 9 pages of Original Document).

(a) space domain    (b) time domain

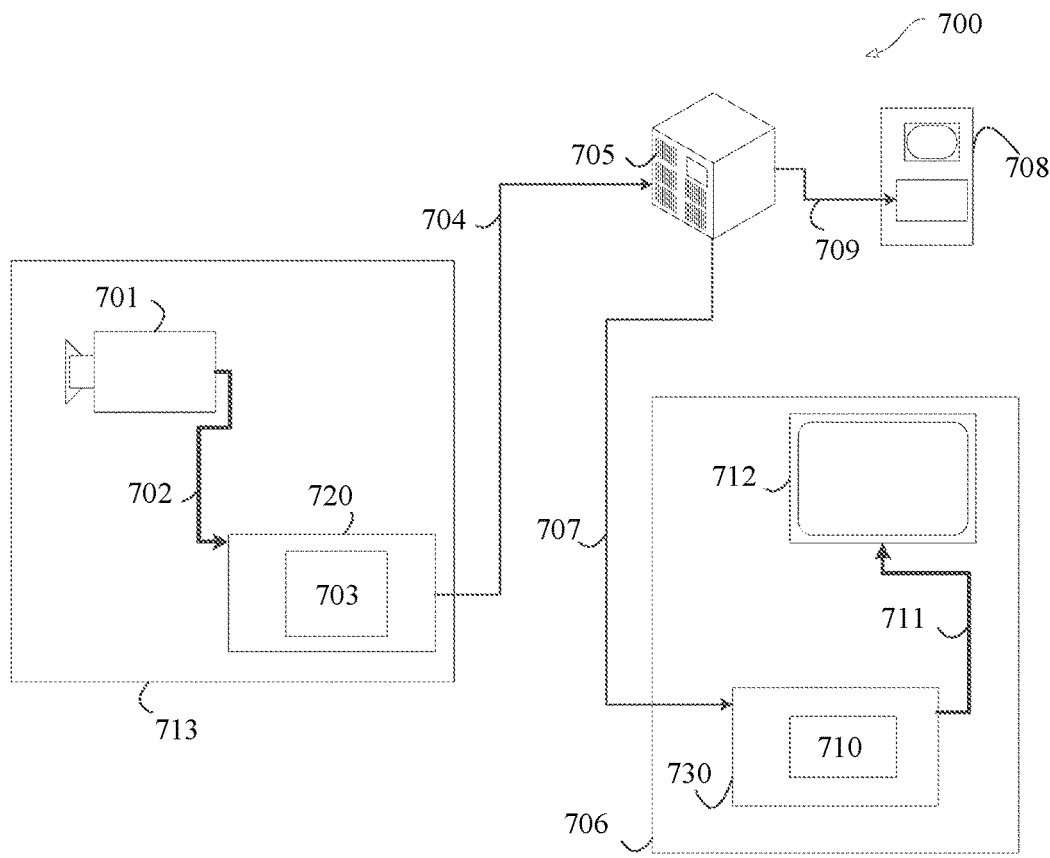

FIG. 7

801 Determine, from a plurality of candidate values, a first value interval to which an absolute value of a displacement vector difference of a current decoding unit in a first direction belongs 802 Determine, based on the first value interval in a case of determining that the displacement vector difference in the first direction correspondingly has a prefix value and a suffix value, a first suffix inverted binarization method used for decoding the suffix value corresponding to the displacement vector difference in the first direction 803 Perform inverted binarization processing on a binary sign string of a first suffix part in a bitstream with the first suffix inverted binarization method, to obtain the suffix value corresponding to the displacement vector difference in the first direction 804 Determine, based on the prefix value and the suffix value corresponding to the displacement vector difference in the first direction, the displacement vector difference in the first direction

FIG. 8

SELECTING A CODING METHOD FOR SUFFIX VALUES FOR DISPLACEMENT VECTOR DIFFERENCES BASED ON VALUE INTERVALS

RELATED APPLICATIONS

This application is a continuation of International Application No. PCT/CN2021/131293, entitled "VIDEO DECODING METHOD AND APPARATUS, VIDEO CODING METHOD AND APPARATUS, AND DEVICE," filed on Nov. 17, 2021, which claims priority to Chinese Patent Application No. 202011414460.0, entitled "VIDEO DECODING METHOD AND APPARATUS, VIDEO ENCODING METHOD AND APPARATUS, AND DEVICE" filed on Dec. 4, 2020. The entire disclosures of the prior applications are hereby incorporated by reference.

FIELD OF THE TECHNOLOGY

Embodiments of this application relate to the field of video encoding and decoding technologies, including a video decoding method and apparatus, a video encoding method and apparatus, and a device.

BACKGROUND OF THE DISCLOSURE

In current video encoding and decoding standards such as versatile video coding (VVC) and audio video coding standard 3 (AVS3), the same encoding and decoding method is used for a motion vector difference (MVD) in an inter-frame prediction mode and a block vector difference (BVD) in an intra block copy (IBC) mode. However, this is not conducive to improvement in encoding and decoding performance.

SUMMARY

Embodiments of this disclosure provide a video decoding method and apparatus, a video encoding method and apparatus, and a device, to facilitate improvement in encoding and decoding performance.

In an embodiment, a video decoding method includes determining, from among plural value intervals, a first value interval to which an absolute value of a displacement vector difference of a current decoding unit in a first direction belongs. The method further includes determining, based on the first value interval, that the displacement vector difference in the first direction has a prefix value and a suffix value, and determining, based on the first value interval, a first suffix decoding method for decoding the suffix value. The method further includes performing decoding processing on a first suffix part in a bitstream using the determined first suffix decoding method, to obtain the suffix value corresponding to the displacement vector difference in the first direction. The method further includes determining, based on the prefix value and the suffix value, the displacement vector difference in the first direction.

In an embodiment, a video encoding method includes determining, from among plural value intervals, a first value interval to which an absolute value of a displacement vector difference of a current encoding unit in a first direction belongs. The method further includes determining, based on the first value interval, that the displacement vector difference in the first direction has a prefix value and a suffix value, and determining, based on the first value interval, a first suffix encoding method for encoding the suffix value. The method further includes performing encoding processing on the suffix value corresponding to the displacement vector difference in the first direction using the first suffix encoding method, to obtain a first suffix part, and performing encoding to generate a bitstream comprising the first suffix part.

In an embodiment, a video decoding apparatus includes processing circuitry configured to determine, from among plural value intervals, a first value interval to which an absolute value of a displacement vector difference of a current decoding unit in a first direction belongs. The processing circuitry is further configured to determine, based on the first value interval, that the displacement vector difference in the first direction has a prefix value and a suffix value, and determine, based on the first value interval, a first suffix decoding method for decoding the suffix value. The processing circuitry is further configured to perform decoding processing on a first suffix part in a bitstream using the first suffix decoding method, to obtain the suffix value corresponding to the displacement vector difference in the first direction, and determine, based on the prefix value and the suffix value, the displacement vector difference in the first direction.

In this disclosure, binarization and inverted binarization methods for suffix values corresponding to displacement vector differences are methods determined based on value intervals to which absolute values of the displacement vector differences belong instead of fixed methods. Through this manner, based on distribution characteristics of the absolute values of the displacement vector differences in different value intervals, the binarization and inverted binarization methods that are suitable for the distribution characteristics and have relatively good encoding and decoding performance are selected, thereby facilitating improvement in encoding and decoding efficiency and compression performance.

BRIEF DESCRIPTION OF THE DRAWINGS

FIG. 7 is a schematic exemplary diagram of placement manners of a video encoder and a video decoder in a streaming transmission environment according to this disclosure.

FIG. 8 to FIG. 13 are flowcharts of video decoding methods according to embodiments of this disclosure.

DESCRIPTION OF EMBODIMENTS

To make the objectives, technical solutions, and advantages of this disclosure clearer, the following further describes the implementations of this disclosure in detail with reference to the accompanying drawings.

Figure 1:
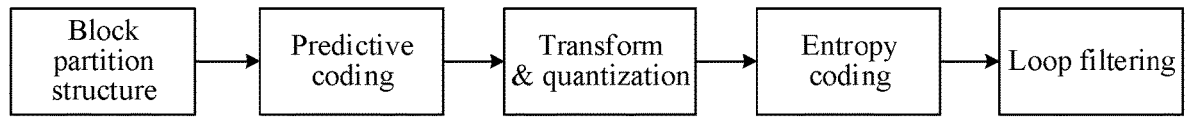
FIG. 1 is a schematic basic flowchart of a video encoding process according to this disclosure.

Before the embodiments of this disclosure are described, a video encoding technology is simply described first with reference to FIG. 1. FIG. 1 is a schematic basic flowchart of a video encoding process.

A video signal refers to an image sequence including a plurality of frames. A frame is representation of spatial information of a video signal. Using a YUV mode as an example, one frame includes one luminance sample matrix (Y) and two chrominance sample matrices (Cb and Cr). Video signal obtaining manners may be divided into two manners of capturing by a video camera and generating by a computer. Compression encoding manners corresponding to different statistical characteristics may also be different.

In some mainstream video encoding technologies, for example, H.265/High Efficiency Video Coding (HEVC), H.266/Versatile Video Coding (VVC) standard, and Audio Video coding Standard (AVS) (for example, AVS3), a hybrid encoding framework is used, to perform a series of operations and processing on an inputted original video signal as follows:

1. Block partition structure: an inputted image is partitioned into several non-overlapping processing units, and a similar compression operation is performed on each processing unit. This processing unit is referred to as a coding tree unit (CTU) or largest coding unit (LCU). The CTU may continue to be finer partitioned downward, to obtain one or more basic encoding units, referred to as coding unit (CU). Each CU is the most basic element in an encoding link. Various encoding manners that may be used for each CU are described below.

2. Predictive coding: Predictive coding includes manners such as intra-frame prediction and inter-frame prediction. After an original video signal is predicted through a selected reconstructed video signal, a difference video signal is obtained. An encoder side needs to decide for the current CU to select the most suitable one of numerous possible predictive coding modes, and informs a decoder side. Intra-frame prediction means that a predicted signal comes from an encoded and reconstructed region in the same image. Inter-frame prediction means that a predicted signal comes from another encoded image (referred to as reference image) different from a current image.

3. Transform & quantization: a difference video signal is subjected to transform operations such as Discrete Fourier Transform (DFT) and Discrete Cosine Transform (DCT), and the signal is converted to a transform domain, which is referred to as a transform coefficient. A lossy quantization operation is further performed on the signal in the transform domain, and some information is lost, so that the quantized signal facilitates compression and expression. In some video encoding standards, there may be two or more transform manners that may be selected. Therefore, the encoder side also needs to select one of the transform manners for the current CU, and informs the decoder side. The fine extent of the quantization is usually decided by a quantization parameter (QP). A larger value of the QP indicates that coefficients in a larger value range are quantized into the same output, and therefore larger distortion and a lower bit rate are usually brought; and on the contrary, a smaller value of the QP indicates that coefficients in a smaller value range are quantized into the same output, and therefore smaller distortion is usually brought and meanwhile corresponds to a higher bit rate.

4. Entropy coding or statistical coding: statistical compression encoding is performed on the quantized signal in the transform domain according to occurrence frequencies of values, and a binary (0 or 1) compressed bitstream is finally outputted. Moreover, other information generated by encoding, for example, a selected mode and a motion vector also needs to be subjected to entropy coding to reduce the bit rate. The statistical coding is a lossless encoding manner, and may effectively reduce the bit rate required to express a similar signal. Common statistical coding manners include variable length coding (VLC) or context-based adaptive binary arithmetic coding (CABAC).

5. Loop filtering: after an encoded image is subjected to operations of inverted quantization, inverted transform, and predictive compensation (inverted operations of the foregoing 2 to 4), a reconstructed decoded image may be obtained. Compared with the original image, some information of the reconstructed image is different from that of the original image because of the effect of quantization, and distortion is generated. A filtering operation is performed on the reconstructed image. A filter such as a deblocking filter, a sample adaptive offset (SAO) filter, or an adaptive lattice filter (ALF) may effectively reduce the extent of distortion generated by quantization. Because the filtered reconstructed image is used as a reference of a subsequent encoded image, and used for predicting a future signal, the foregoing filtering operation is also referred to as loop filtering and a filtering operation in an encoding loop.

It may be seen according to the foregoing encoding process that, at the decoder side, for each CU, after obtaining the compressed bitstream, a decoder first performs entropy decoding, to obtain various mode information and quantized transform coefficients. The coefficients are subjected to inverted quantization and inverted transform, to obtain the difference signal. In another aspect, according to the known coding mode information, a predicted signal corresponding to the CU may be obtained, and after the two signals are added, the reconstructed signal may be obtained. Finally, a reconstruction value of the decoded image needs to be subjected to an operation of loop filtering, to generate a final output signal.

In each of some mainstream video encoding standards, for example, standards such as HEVC, VVC, and AVS3, a block-based hybrid encoding framework is used. In the standards, original video data is divided into a series of encoded blocks, and the video data is compressed with reference to video encoding methods such as prediction, transform, and entropy coding. The motion compensation is a type of prediction method frequently used for video encoding, and the motion compensation deduces a predicted value of the current encoded block from the encoded region based on redundancy characteristics of video content in time domain or space domain. This type of prediction methods includes: inter-frame prediction, intra block copy prediction, intra string copy prediction, and the like. In specific encoding implementation, these prediction methods may be used individually or combined. For an encoded block using these prediction methods, one or more two-dimensional displacement vectors usually need to be explicitly or implicitly encoded in the bitstream, to indicate one or more displacements of the current block (or a co-located block of the current block) relative to one or more reference blocks of the current block.

In different prediction modes and different implementations, displacement vectors may have different names, which are uniformly described in the following manner in this specification: 1) a displacement vector in an inter-frame prediction mode is referred to as a motion vector (MV); 2) a displacement vector in an IBC prediction mode is referred to as a block vector (BV); and 3) a displacement vector in an intra string copy (ISC) prediction mode is referred to as a string vector (SV). ISC is also referred to as "string prediction" or "string matching".

The MV refers to a displacement vector used for the inter-frame prediction mode, points from the current image to a reference image, and has a value being a coordinate offset between the current block and a reference block, where the current block and the reference block are in two different images. In the inter-frame prediction mode, motion vector prediction may be introduced. A motion vector predictor corresponding to the current block is obtained by predicting a motion vector of the current block, and a difference between the motion vector predictor corresponding to the current block and an actual motion vector is encoded and transmitted, which facilitates saving of bit overheads relative to a case that the actual motion vector corresponding to the current block is directly encoded and transmitted. In the embodiments of this disclosure, the motion vector predictor refers to a predicted value of the motion vector of the current block obtained through a motion vector prediction technology.

The BV refers to a displacement vector used for the IBC prediction mode, and has a value being a coordinate offset between the current block and a reference block, where the current block and the reference block are both in the current image. In the IBC mode, block vector prediction may be introduced. A block vector predictor corresponding to the current block is obtained by predicting a block vector of the current block, and a difference between the block vector predictor corresponding to the current block and an actual block vector is encoded and transmitted, which facilitates saving of bit overheads relative to a case that the actual block vector corresponding to the current block is directly encoded and transmitted. In the embodiments of this disclosure, the block vector predictor refers to a predicted value of the block vector of the current block obtained through a block vector prediction technology.

The SV refers to a displacement vector used for the ISC prediction mode, and has a value being a coordinate offset between the current string and a reference string, where the current string and the reference string are both in the current image. In the ISC mode, string vector prediction may be introduced. A string vector predictor corresponding to the current string is obtained by predicting a string vector of the current string, and a difference between the string vector predictor corresponding to the current string and an actual string vector is encoded and transmitted, which facilitates saving of bit overheads relative to a case that the actual string vector corresponding to the current string is directly encoded and transmitted. In the embodiments of this disclosure, the string vector predictor refers to a predicted value of the string vector of the current string obtained through a string vector prediction technology.

Figure 2:
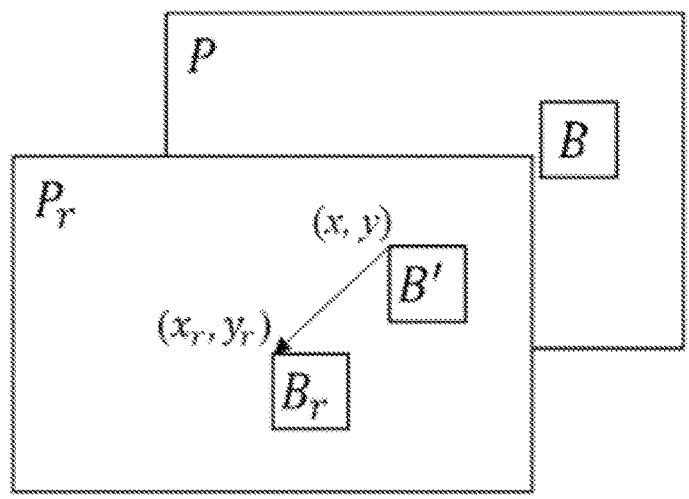
FIG. 2 is a schematic diagram of an inter-frame prediction mode according to an embodiment of this disclosure.

Several different prediction modes are described below:
1. Inter-Frame Prediction Mode As shown in FIG. 2, the inter-frame prediction is to predict a pixel of the current image by using correlation of time domain of the video and using a pixel of an adjacent encoded image, so that the time domain of the video is not redundant, which can effectively save bits of encoding difference data. P is the current frame, Pr is the reference frame, B is the current to-be-encoded block, Br is the reference block of B. B' and B have the same coordinate position in the image, coordinates of Br are (xr, yr), and coordinates of B' are (x, y). The displacement between the current to-be-encoded block and its reference block is referred to as a motion vector (MV), that is, $$MV=(xr-x, yr-y).$$

Considering that neighboring blocks in the time domain or space domain have relatively strong correlation, bits required to encode the MV may be further reduced with the MV prediction technology. In H.265/HEVC, inter-frame prediction includes such two MV prediction technologies as Merge and Advanced Motion Vector Prediction (AMVP).

In the Merge mode, an MV candidate list is established for a current prediction unit (PU), where five candidate MVs (and their corresponding reference images) exist. The five candidate MVs are traversed, and a candidate MV whose rate-distortion cost is minimum is selected as an optimal MV. In a case that a codec establishes a candidate list according to the same manner, the encoder needs to transmit an index of the optimal MV in the candidate list. The MV prediction technologies of HEVC further include a skip mode, which is a special case of the Merge mode. After the optimal MV is found in the Merge mode, in a case that the current block and the reference block are basically the same, then difference data does not need to be transmitted, an index of the MV and a skip flag need to be transferred.

Figure 3:
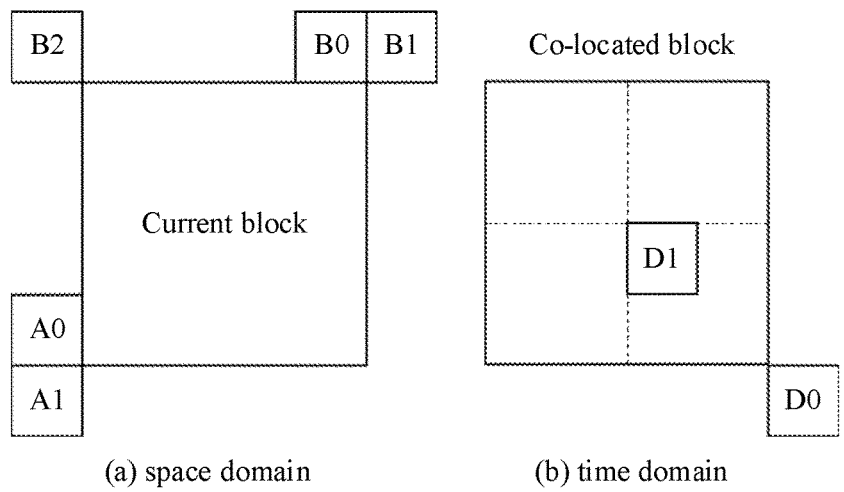
FIG. 3 is a schematic diagram of a candidate motion vector according to an embodiment of this disclosure.

The MV candidate list established in the Merge mode includes such two situations as space domain and time domain, and further includes a combination list manner for a B Slice (B frame image). The space domain provides at most four candidate MVs, which are established as a part (a) shown in FIG. 3. The space domain list is established according to an order of A1→B1→B0→A0→B2, where B2 is a substitute, that is, when one or more of A1, B1, B0, and A0 do not exist, motion information of B2 needs to be used; and the time domain provides one candidate MV at most, which is established as a part (b) shown in FIG. 3, and is obtained by scaling an MV of a co-located PU according to the following formula:

$$curMV=td*colMV/tb$$

where curMV represents the MV of the current PU, colMV represents the MV of the co-located PU, td represents a distance between the current image and the reference image, and tb represents a distance between the co-located image and the reference image. In a case that a PU in a position D0 on the co-located block is not available, replacement is performed with a co-located PU in a position D1. For a PU in the B Slice, because two MVs exist, its MV candidate list also needs to provide two motion vector predictors (MVP). In the HEVC, first four candidate MVs in the MV candidate list are combined in pairs, to generate a combination list used for the B Slice.

Similarly, in the AMVP mode, the MV candidate list is established for the current PU with a correlation between MVs of neighboring blocks in space domain and time domain. Different from the Merge mode, an optimal predicted MV is selected from the MV candidate list in the AMVP mode, and the optimal predicted MV and an optimal MV of the current to-be-encoded block obtained through motion search are differentially encoded, that is, encoded MVD=MV−MVP, where MVD is a motion vector difference; and by establishing the same list, the decoder side may calculate the MV of the current decoding block in need of sequence numbers of the MVD and the MVP in the list. The MV candidate list of the AMVP mode also includes such two situations as space domain and time domain, but the difference is that the length of the MV candidate list of the AMVP mode is 2.

As described above, in the AMVP mode of HEVC, the MVD needs to on be encoded. In HEVC, the resolution of the MVD is controlled by use_integer_mv_flag in slice_header, and when a value of the flag is 0, the MVD is encoded with ¼ (luminance) pixel resolution; and when a value of the flag is 1, the MVD is encoded with integer (luminance) pixel resolution. An adaptive motion vector resolution (AMVR) method is used in VVC. The method allows each CU to adaptively select resolution for encoding an MV. In an ordinary AMVP mode, selectable resolutions include ¼-pixel resolution, ½-pixel resolution, 1-pixel resolution, and 4-pixel resolution. For a CU having at least one non-zero MVD component, a flag is first encoded to indicate whether to use ¼ luminance sampling MVD resolution for the CU. In a case that the flag is 0, the MVD of the current CU is encoded using ¼-pixel resolution. Otherwise, a second flag needs to be encoded, so as to indicate that the CU uses ½-pixel resolution or another MVD resolution. Otherwise, a third flag is encoded to indicate whether to use 1-pixel resolution or 4-pixel resolution for the CU.

2. IBC Prediction Mode

Figure 4:
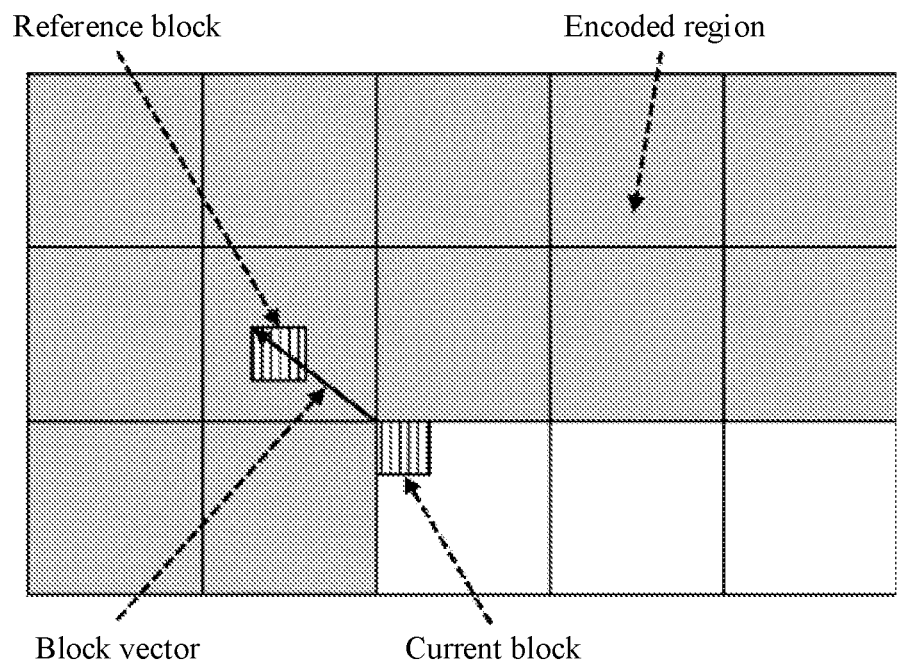
FIG. 4 is a schematic diagram of an intra block copy mode according to an embodiment of this disclosure.

IBC is an intra-frame encoding tool adopted in HEVC screen content coding (SCC) extension, and notably improves encoding efficiency of screen content. In AVS3 and VVC, the IBC technology is also adopted to improve performance of SCC. IBC predicts the pixel of the current to-be-encoded block using a correlation between screen content videos in space and using the encoded image pixel on the current image, which can effectively save bits required to encode the pixel. As shown in FIG. 4, a displacement between the current block and its reference block in IBC is referred to as a block vector (BV). H.266/VVC uses a BV prediction technology similar to inter-frame prediction to further save bits required to encode the BV, and allows the 1-pixel or 4-pixel resolution to be used for encoding the BVD.

3. ISC Prediction Mode

Figure 5:
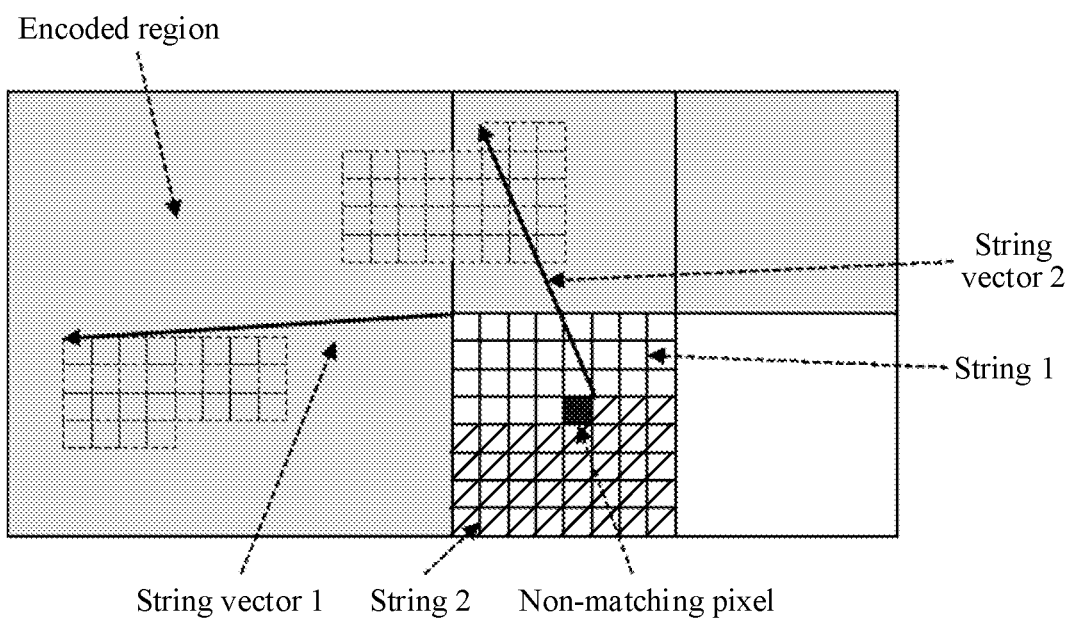
FIG. 5 is a schematic diagram of an intra string copy mode according to an embodiment of this disclosure.

The ISC technology divides an encoded block into a series of pixel strings or non-matching pixels according to a scanning order (for example, raster scanning, round-trip scanning, Zig-Zag scanning and the like). Similar to IBC, each string searches the encoded region of the current image for the reference string in the same shape, the predicted value of the current string is deduced, and a difference between the pixel value of the current string and the predicted value is encoded, to replace a directly encoded pixel value, which can effectively save bits. FIG. 5 provides a schematic diagram of intra string copy, where a dark gray region is an encoded region, 28 white pixels are a string 1, 35 light gray pixels are a string 2, and a black pixel represents a non-matching pixel. A displacement between the string 1 and its reference string is a string vector 1 in FIG. 4. A displacement between the string 2 and its reference string is a string vector 2 in FIG. 4.

The intra string copy technology needs to encode an SV corresponding to each string in the current encoded block, a string length, a flag indicating whether there is a matching string, and the like. SV represents a displacement from the to-be-encoded string to its reference string. The string length represents the quantity of pixels included in the string. In different implementations, the string length is encoded in a plurality of manners, and several examples are provided below (some examples may be combined): 1) directly encoding a length of a string in the bitstream; 2) encoding the quantity of subsequent to-be-processed pixels of the string in the bitstream, where the decoder side performs calculation according to the size N of the current block, the quantity N1 of processed pixels, and the quantity N2 of to-be-processed pixels obtained by decoding, to obtain the length of the current string, L=N−N1−N2; and 3) encoding a flag in the bitstream to indicate whether the string is a last string, where in a case that the string is the last string, the decoder side performs calculation according to the size N of the current block and the quantity N1 of processed pixels, to obtain the length of the current string, L=N−N1. In a case that a corresponding reference has not been found for a pixel in a referable region, the pixel value of the non-matching pixel is directly encoded.

A BVD decoding process in the AVS3 standard is provided in the following table 1 (an underlined bold field represents a syntactic element that needs to be decoded, a field that is not underlined and has an initial letter capitalized represents a variable, a value of the variable may be obtained by decoding the syntactic element, and some details unrelated to this disclosure are omitted in the following process):

TABLE 1

| | |
|---|---|
| if (IbcCuFlag) { | |
|    cbvp_index | ae(v) |
|    if (AbvrEnableFlag) | |
|       abvr_index | ae(v) |
|    mv_diff_x_abs_bv | ae(v) |
|    if(MvDifXAbsBv) | |
|       mv_diff_x_sign_bv | ae(v) |
|    mv_diff_y_abs_bv | ae(v) |
|    if (MvDifYAbsBv) | |
|       mv_diff_y_sign_bv | ae(v) |
| } | |

Related Semantic Description:

1. Intra Block Copy Mode Flag ibc_cu_flag

It is a two-valued variable. When the value is '1', it indicates that the current coding unit is in the IBC prediction mode. When the value is '0', it indicates that the current coding unit is not in the IBC prediction mode. A value of IbcCuFlag is equal to that of ibc_cu_flag. In a case that ibc_cu_flag does not exist in the bitstream, a value of IbcCuFlag is equal to 0.

2. Adaptive Block Vector Resolution Enable Flag abvr_enable_flag

It is a two-valued variable. When the value is '1', it indicates that the adaptive block vector resolution may be used. When the value is '0', it indicates that the adaptive block vector resolution is not used. A value of AbvrEnableFlag is equal to a value of abvr_enable_flag. In a case that abvr_enable_flag does not exist in the bitstream, a value of AbvrEnableFlag is equal to 0.

3. Adaptive Block Vector Resolution Index abvr_index

It is used for determining the block vector resolution of a coding unit. In a case that a value of abvr_index is '0', a value of AbvrIndex is equal to 0. In a case that a value of abvr_index is '1', a value of AbvrIndex is equal to 2. In a case that abvr_index does not exist in the bitstream, a value of AbvrIndex is equal to 0.

In a case that the coding unit is in the IBC prediction mode, the basic unit of the BV is decided according to AbvrIndex:

In a case that a value of AbvrIndex is 0, the basic unit of the BV is 1 integer sample.

In a case that a value of AbvrIndex is 1, the basic unit of the BV is 4 integer samples.

4. Absolute value of horizontal component difference of block vector mv_diff_x_abs_bv; and absolute value of vertical component difference of block vector mv_diff_y_abs_bv It is an absolute value of the BVD. MvDiffXAbsBv is equal to a value of mv_diff_x_abs_bv, and MvDiffYAbsBv is equal to a value of mv_diff_y_abs_bv.

5. Sign value of horizontal component difference of block vector mv_diff_x_sign_bv; and sign value of vertical component difference of block vector mv_diff_y_sign_bv It is a sign bit of the BVD. A value of MvDiffXSignbV is equal to a value of mv_diff_x_sign_bv, and a value of MvDiffYSignBv is equal to that of mv_diff_y_sign_bv. In a case that mv_diff_x_sign_bv or mv_diff_y_sign_bv does not exist in the bitstream, a value of MvDiffXSignBv or MvDiffYSignBv is 0. In a case that a value of MvDiffXSignBv is 0, MvDiffXBv (the horizontal component of the BVD) is equal to MvDiffXAbsBv. In a case that a value of MvDiffXSignBv is 1, MvDiffXBv is equal to −MvDiffXAbsBv. In a case that a value of MvDiffYSignBv is 0, MvDiffYBv (the vertical component of the BVD) is equal to MvDiffYAbsBv. In a case that a value of MvDiffYSignBv is 1, MvDiffYBv is equal to −MvDiffYAbsBv. Value ranges of MvDiffXBv and MvDiffYBv are from −32768 to 32767.

Additionally, the BV deducing process in the IBC prediction mode is as follows:

$$MvDiffXBv = MvDiffXBv << (AbvrIndex+2)$$

$$MvDiffYBv = MvDiffYBv << (AbvrIndex+2)$$

$$MvPredXBv = Rounding(MvPredXBv, AbvrIndex+2) << (AbvrIndex+2)$$

$$MvPredYBv = Rounding(MvPredYBv, AbvrIndex+2) << (AbvrIndex+2)$$

$$bvE\_x = Clip3(-32768, 32767, MvDiffXBv + MvPredXBv)$$

$$bvE\_y = Clip3(-32768, 32767, MvDiffYBv + MvPredYBv)$$

where MvDiffXBv is the horizontal component of the BVD, MvDiffYBv is the vertical component of the BVD, MvPredXBv is a horizontal component of a block vector predictor (BVP), MvPredYBv is a vertical component of the BVP, bvE_x is the horizontal component of the BV, and bvE_y is the vertical component of the BV.

With reference to the table 1, an MVD/BVD related entropy coding solution in the AVS3 standard is described below. Because the BVD and the MVD use the same entropy coding and binarization solutions in the current AVS3 standard, the BVD entropy decoding process is mainly described below using the decoder side as an example:

1) first decoding the BVD horizontal direction absolute value mv_diff_x_abs_bv;
2) in a case that mv_diff_x_abs_bv is not 0, decoding the sign mv_diff_x_sign_bv of mv_diff_x_abs_bv;
3) decoding the BVD vertical direction absolute value mv_diff_y_abs_bv; and
4) in a case that mv_diff_y_abs_bv is not 0, decoding the sign mv_diff_y_sign_bv of mv_diff_y_abs_bv.

The BVD related inverted binarization method in the AVS3 standard is described below (some details unrelated to this disclosure are omitted):

1. Steps of parsing a binary sign string (signed binary string) are as follows:
   a) Set a value of an index number binIdx of a binary sign to −1, where the binary sign string is empty.
   b) Add 1 to the value of binIdx, and then perform the following operations:
      1) In a case that the current binary sign is one of the following binary signs, set a value of BypassFlag to 1:
         a binary sign of mv_diff_x_sign or mv_diff_y_sign; and
         a binary sign of mv_diff_x_abs or mv_diff_y_abs whose binIdx is greater than or equal to 3.
      2) Otherwise, in a case that the current binary sign is one of the following binary signs, set a value of BypassFlag to 0 and a value of StuffingBitFlag to 1:
         a binary sign of aec_lcu_stuffing_bit; and
         a binary sign of aec_ipcm_stuffing_bit.
      3) Otherwise, set values of BypassFlag and StuffingBitFlag to 0, obtain unique ctxIdx corresponding to each binary sign according to binIdx, and deduce a binary sign model ctx according to ctxIdx.
   c) In a case that the current binary sign is coeff_last, set a value of CtxWeight to 1;
      otherwise, set a value of CtxWeight to 0.
   d) Parse the current binary sign.
   e) Add the binary sign obtained by step c to the tail of the binary sign string, to obtain an updated binary sign string.
   f) Compare the binary sign string obtained by step d with a related table (a correspondence between an index value and a binary sign string is recorded in the table, for example, the following table 2). In a case that the binary sign string matches a binary sign string in the table, parsing on the binary sign string is completed; otherwise, the process returns to step b, to continue to parse a next binary sign.

2. Inverted binarization method for mv_diff_x_abs_bv and mv_diff_y_abs_bv

The value of synElVal is obtained by looking up the table 2 according to the binary sign string. In the table 2, in a case that a value of synElVal is greater than or equal to 3 and a value of synElVal is an odd number, first four bits of the binary sign string are '1110', and a subsequent bit is a 0-order exponential-Golomb code corresponding to (synElVal−3)/2; and in a case that a value of synElVal is greater than 3 and a value of synElVal is an even number, first four bits of the binary sign string are '1111', and a subsequent bit is a 0-order exponential-Golomb code corresponding to (synElVal−3)/2.

A value of mv_diff_x_abs_bv or mv_diff_y_abs_bv is equal to synElVal.

TABLE 2

| Value of synElVal | Binary sign string | | | | | | | | | |
|---|---|---|---|---|---|---|---|---|---|---|
| 0 | 0 | | | | | | | | | |
| 1 | 1 | 0 | | | | | | | | |
| 2 | 1 | 1 | 0 | | | | | | | |
| 3 | 1 | 1 | 1 | 0 | 1 | | | | | |
| 4 | 1 | 1 | 1 | 1 | 1 | | | | | |
| 5 | 1 | 1 | 1 | 0 | 0 | 1 | 0 | | | |
| 6 | 1 | 1 | 1 | 1 | 0 | 1 | 0 | | | |
| 7 | 1 | 1 | 1 | 0 | 0 | 1 | 1 | | | |
| 8 | 1 | 1 | 1 | 1 | 0 | 1 | 1 | | | |
| 9 | 1 | 1 | 1 | 0 | 0 | 0 | 1 | 0 | 0 | |
| 10 | 1 | 1 | 1 | 1 | 0 | 0 | 1 | 0 | 0 | |
| 11 | 1 | 1 | 1 | 0 | 0 | 0 | 1 | 0 | 1 | |
| 12 | 1 | 1 | 1 | 1 | 0 | 0 | 1 | 0 | 1 | |
| 13 | 1 | 1 | 1 | 0 | 0 | 0 | 1 | 1 | 0 | |
| 14 | 1 | 1 | 1 | 1 | 0 | 0 | 1 | 1 | 0 | |
| ... | | | | | | | | | | |
| binIdx | 0 | 1 | 2 | 3 | 4 | 5 | 6 | 7 | 8 | 9 | 10 |

Next, CABAC is described. The CABAC process mainly includes the following three steps:
1, binarization;
2, context modeling; and
3, binary arithmetic coding.

After an inputted syntactic element is binarized, binary data may be encoded through a regular coding mode and a bypass coding mode. In the bypass coding mode, it is unnecessary to allocate a particular probability model to each binary bit, and an inputted binary bit (bin) is directly encoded using a simple bypass encoder, so as to accelerate the entire encoding and decoding.

Usually, different syntactic elements are not completely independent of each other, and the same syntactic element itself also has specific memorability. Therefore, according to the condition entropy theory, conditional encoding is performed using other encoded syntactic elements, which can further improve encoding performance relative to independent encoding or memoryless encoding. The encoded sign information used as conditions is referred to as a context. In the regular coding mode, bin of syntactic elements enters a context modeler in order. The encoder allocates an appropriate probability model to each inputted binary bit according to a value of the previously encoded syntactic element or binary bit, and the process is context modeling. After the bin and the allocated probability model are fed together into the binary arithmetic coder and encoded, the context model needs to be updated according to the bin value, that is, the adaptive process in encoding.

Theoretically, more conditions indicate that a smaller condition entropy is obtained, and therefore better encoding performance can be achieved by increasing the context order. However, as the order of the context model increases, complexity of storing and updating the probability model also increases at an amazing speed. In a case that the quantity of probability models is reduced, the encoder cannot accurately estimate the probability, degrading the encoding performance. Therefore, during context model design, it is not only necessary to consider how to fully use the context model to improve the encoding efficiency, but also necessary to consider probability model implementation complexity increased by introducing the context model.

Moreover, to use limited probability model resources to achieve as high as possible encoding performance, application of the context model is targeted. Specific representation is as follows: for those events occurring at a high probability and playing a leading role in affecting the encoding performance, establishing a delicate context model may increase the order of the context model to achieve finer conditional estimation; and for events occurring at a low probability and little affecting the encoding performance, a relatively simple context model may be established, and even different context models may exist, or the events are considered as events of equal probability and encoded.

In the current AVS3 standard, the MVD in the inter-frame prediction mode and the BVD in the IBC prediction mode use the same encoding and decoding manners. However, distribution of MVDs (absolute values) is relatively sharp, and the vast majority of values are centralized near 0. Compared with the MVDs, distribution of BVDs (absolute values) is more dispersed, and a probability that a relatively large value occurs is relatively large. The BVDs (absolute values) are mostly centralized to be relatively small values, and then are distributed relatively flat in a middle interval. Additionally, when a value of the BVD in the horizontal direction is equal to 0, a probability that a value of the BVD in the vertical direction is equal to 0 is relatively large.

The current displacement vector difference encoding and decoding solutions are more applicable to encoding a syntactic element such as the MVD whose distribution is more sharp and that tends to be a smaller value. However, because of factors such as a reference range limitation difference between the inter-frame prediction mode and the IBC prediction mode, distribution characteristics of the MVD and the BVD are not completely consistent. As described above, compared with the MVD, distribution of the BVD is more uniform, and data skewness is smaller. Therefore, using the encoding manner applicable to the MVD to encode the BVD cannot completely bring the distribution characteristic of the BVD into play. As a result, optimal compression efficiency of the BVD encoding cannot be achieved.

According to the difference between the distribution features of the MVD and the BVD, this disclosure proposes a displacement vector difference encoding and decoding method more conforming to the distribution characteristic of the BVD, which facilitates improvement in the encoding and decoding efficiency of the BVD, thereby improving video compression performance.

Figure 6:
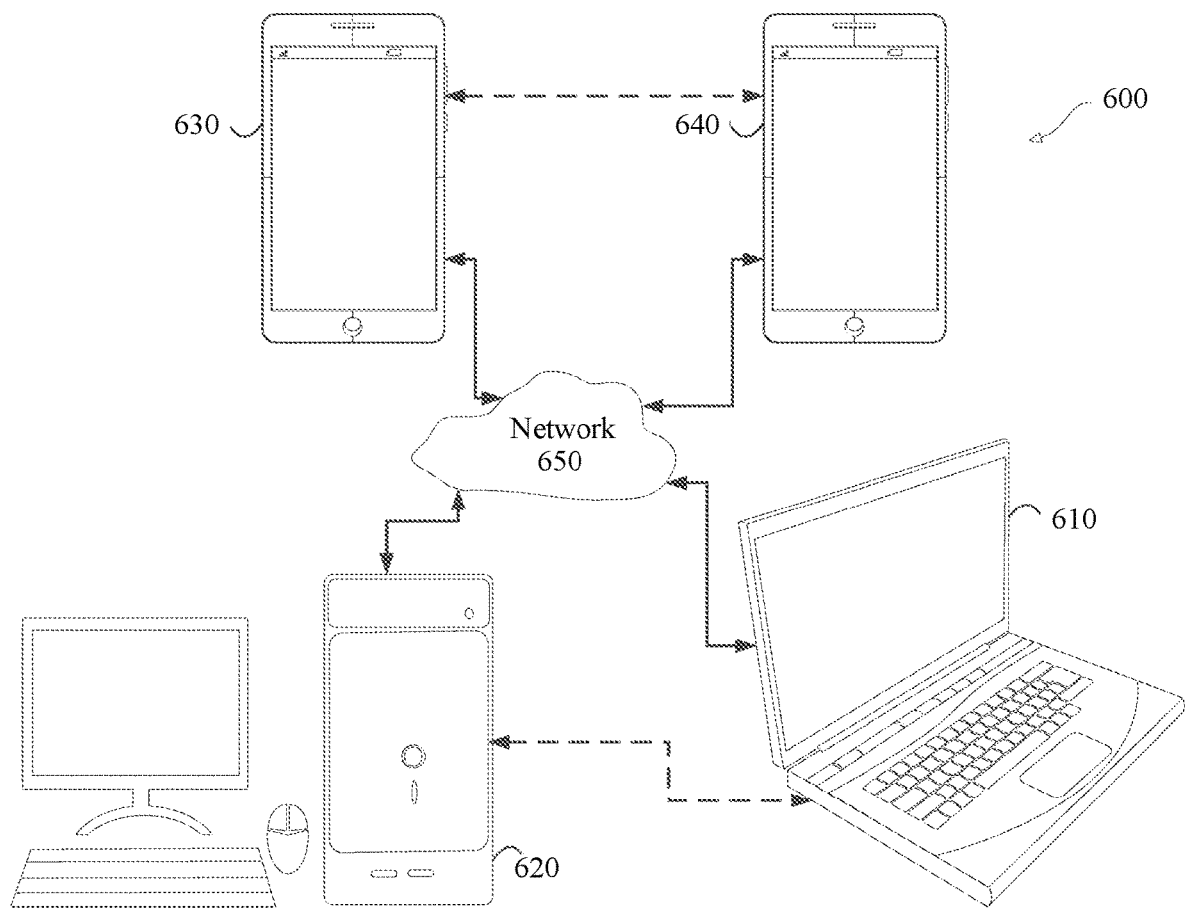
FIG. 6 is a simplified block diagram of a communication system according to an embodiment of this disclosure.

FIG. 6 is a simplified block diagram of a communication system according to an embodiment of this disclosure. The communication system 600 includes a plurality of devices, and the devices may communicate with each other through, for example, a network 650. For example, the communication system 600 includes a first device 610 and a second device 620 connected to each other through the network 650. In the embodiment in FIG. 6, the first device 610 and the second device 620 perform unidirectional data transmission. For example, the first device 610 may encode video data, for example, a video picture stream captured by the first device 610 and transmit the encoded video data to the second device 620 through the network 650. The encoded video data is transmitted in the form of one or more encoded video bitstreams. The second device 620 may receive the encoded video data from the network 650, decode the encoded video data to restore the video data, and display video pictures according to the restored video data. The unidirectional data transmission is relatively common in applications such as media service.

In another embodiment, the communication system 600 includes a third device 630 and a fourth device 640 that perform bidirectional transmission on the encoded video data, and the bidirectional transmission may occur, for example, during a video conference. For the bidirectional data transmission, one of the third device 630 and the fourth device 640 may encode video data (for example, a video picture stream captured by the device), and transmit the encoded video data to the other of the third device 630 and the fourth device 640 through the network 650. The one of the third device 630 and the fourth device 640 may further receive the encoded video data transmitted by the other of the third device 630 and the fourth device 640, may decode the encoded video data to restore the video data, and may display video pictures on an accessible display apparatus according to the restored video data.

In the embodiment in FIG. 6, each of the first device 610, the second device 620, the third device 630, and the fourth device 640 may be a computer device such as a server, a personal computer, or a smartphone, but the principle disclosed in this disclosure may not be limited thereto. This embodiment of this disclosure is applicable to a personal computer (PC), a mobile phone, a tablet computer, a media player, and/or a dedicated video conference device. The network 650 represents any quantity of networks transferring encoded video data between the first device 610, the second device 620, the third device 630 and the fourth device 640, and includes, for example, a wired or line-connected communication network and/or a wireless communication network. The communication network 650 may exchange data in a circuit switched channel and/or packet switched channel. The network may include a telecommunication network, a local area network, a wide area network and/or the Internet. For the sake of this disclosure, unless explained below, the architecture and topology of the network 650 may be insignificant for operations disclosed in this disclosure.

In an embodiment, FIG. 7 shows placement manners of a video encoder and a video decoder in a streaming transmission environment. The subject matter disclosed in this disclosure may be equivalently applicable to other video supporting applications, including, for example, a video conference, a digital television (TV), and storage of a compressed video on digital mediums including a compact disc (CD), a digital versatile disc (DVD), a memory stick and the like.

A streaming transmission system may include a capture sub-system 713, the capture sub-system may include a video source 701 such as a digital camera, and the video source creates a video picture stream 702 not compressed. In an embodiment, the video picture stream 702 includes a sample photographed by the digital camera. Compared with encoded video data 704 (or encoded video bitstream), the video picture stream 702 is depicted as a bold line to emphasize the video picture stream of a high data volume, the video picture stream 702 may be processed by an electronic apparatus 720, and the electronic apparatus 720 includes a video encoder 703 coupled to the video source 701. The video encoder 703 may include hardware, software or a combination of software and hardware to perform or implement aspects of the disclosed subject matters described below in more detail. Compared with the video picture stream 702, the encoded video data 704 (or encoded video bitstream 704) is depicted as a fine line to emphasize the encoded video data 704 (or encoded video bitstream 704) of a relatively low data volume, and may be stored on a streaming transmission server 705 for future use. One or more streaming transmission client sub-system, for example, a client sub-system 706 and a client sub-system 708 in FIG. 7 may access the streaming transmission server 705 to retrieve a duplicate 707 and a duplicate 709 of the encoded video data 704. The client sub-system 706 may include, for example, a video decoder 710 in an electronic apparatus 730. The video decoder 710 decodes the inputted duplicate 707 of the encoded video data, and generates an output video picture stream 711 that may be presented on a display 712 (for example, display screen) or another presentation apparatus (not depicted). In some streaming transmission systems, the encoded video data 704, video data 707 and video data 709 (for example, video bitstream) may be encoded according to some video encoding/compression standards.

The electronic apparatus 720 and the electronic apparatus 730 may include other components (not shown). For example, the electronic apparatus 720 may include a video decoder (not shown), and the electronic apparatus 730 may further include a video encoder (not shown). The video decoder is used for decoding the received encoded video data; and the video encoder is used for encoding the video data.

The technical solutions provided in the embodiments of this disclosure may be applied to the H.266/VVC standard, the H.265/HEVC standard, AVS (for example, AVS3) or next-generation video encoding and decoding standards. This is not limited in the embodiments of this disclosure.

Steps of a video decoding method provided in the embodiments of this disclosure may be performed by a decoder side device. Steps of a video encoding method provided in the embodiments of this disclosure may be performed by an encoder side device. The decoder side device and the encoder side device may be any computer device having data calculating, processing and storage capabilities, for example, a PC, a mobile phone, a tablet computer, a media player, a dedicated video conference device, or a server.

Additionally, a method provided in this disclosure may be individually used or be combined with another method in any order. The encoder and the decoder based on the method provided in this disclosure may be implemented by one or more processors or one or more integrated circuits. The technical solutions of this disclosure are described below by using several embodiments.

Video decoding methods provided in this disclosure are described below by using embodiments.

FIG. 8 is a flowchart of a video decoding method according to an embodiment of this disclosure. The method may be applied to a decoder side device. The method may include the following steps (801 to 804):

Step 801. Determine, from a plurality of candidate values, a first value interval to which an absolute value of a displacement vector difference of a current decoding unit in a first direction belongs. For example, a first value interval to which an absolute value of a displacement vector difference of a current decoding unit in a first direction belongs is determined from among plural value intervals.

In an embodiment, the first direction is a horizontal direction or a vertical direction. The absolute value of the displacement vector difference of the current decoding unit in the first direction may be equal to 0, or may be greater than 0.

In an embodiment, a plurality of candidate value intervals are determined based on the plurality of candidate values, and the first value interval may be any one of the foregoing plurality of candidate value intervals. For example, the plurality of candidate values include 0, 5, 9, 17 and the like, and the plurality of candidate value intervals may be obtained based on the several values and include: [0, 5), [5, 9), [9, 17), and [17, co). The first value interval may be any one of the foregoing 4 candidate value intervals.

In an embodiment, the plurality of candidate values (or the plurality of candidate value intervals) are set based on a distribution characteristic of the displacement vector difference. For different prediction modes, for example, an inter-frame prediction mode, an IBC prediction mode, an ISC prediction mode and the like, distribution characteristics of displacement vector differences are different. Therefore, when the technical solution of this disclosure is applied to a prediction mode, a plurality of candidate values (or a plurality of candidate value intervals) need to be set based on a distribution characteristic of a displacement vector difference in the prediction mode. For example, for the IBC prediction mode, most absolute values of the BVD are centralized in [0, 5), and then are distributed relatively flat in intervals [5, 9) and [9, 17). Then, for the IBC prediction mode, based on the foregoing distribution characteristic of the BVD, for example, the following 4 candidate value intervals may be set: [0, 5), [5, 9), [9, 17), and [17, co).

The displacement vector difference encoding and decoding method provided in this embodiment of this disclosure is not limited to being applicable to encoding and decoding of the BVD in the IBC prediction mode, and may be further applicable to encoding and decoding of the SVD in the ISC prediction mode, encoding and decoding of the MVD in the inter-frame prediction mode, and the like. This is not limited in this embodiment of this disclosure. Therefore, in a case that the current decoding unit belongs to an IBC decoding block, then the displacement vector difference is a BVD; in a case that the current decoding unit belongs to an ISC decoding block, then the displacement vector difference is an SVD; and in a case that the current decoding unit belongs to a decoding block in an inter-frame prediction mode, then the displacement vector difference is an MVD.

Additionally, in this embodiment of this disclosure, a plurality of methods are provided, so as to determine the first value interval from the plurality of candidate values (or the plurality of candidate value intervals). For example, the first value interval may be determined based on the prefix value corresponding to the displacement vector difference in the first direction; or the first value interval may be determined based on one or more range identifiers; or the first value interval may be determined with reference to the prefix value corresponding to the displacement vector difference in the first direction, and one or more range identifiers. For specific methods, reference may be made to the descriptions in the following embodiments.

Step 802. Determine, based on the first value interval in a case of determining that the displacement vector difference in the first direction correspondingly has a prefix value and a suffix value, a first suffix inverted binarization method used for decoding the suffix value corresponding to the displacement vector difference in the first direction. For example, it may be determined that that the displacement vector difference in the first direction has a prefix value and a suffix value, based on the first value interval. Then, a first suffix decoding method for decoding the suffix value may be determined based on the first value interval.

In the current AVS3 standard, binarization and inverted binarization are performed on the prefix value corresponding to the displacement vector difference by using a truncated unary code whose truncated value is 3, and binarization and inverted binarization are performed on the suffix value corresponding to the displacement vector difference by using a 0-order exponential-Golomb code. That is, the prefix value and suffix value binarization and inverted binarization methods are both fixed methods.

Different from this, in this embodiment of this disclosure, binarization and inverted binarization methods for suffix values corresponding to displacement vector differences are methods determined based on value intervals to which absolute values of the displacement vector differences belong instead of fixed methods.

For example, in a case that the first value interval meets a first condition, it is determined that the first suffix inverted binarization method used for decoding the suffix value corresponding to the displacement vector difference in the first direction is a first method; in a case that the first value interval meets a second condition, it is determined that the first suffix inverted binarization method used for decoding the suffix value corresponding to the displacement vector difference in the first direction is a second method; and the first method and the second method are two different inverted binarization methods, and are methods that are set based on distribution characteristics of the absolute value of the displacement vector differences in the value interval, are suitable for the distribution characteristics, and have relatively good encoding and decoding performance.

In an exemplary embodiment, it is determined, in a case that the first value interval meets a first condition, that the first suffix inverted binarization method is a fixed-length code manner; and it is determined, in a case that the first value interval meets a second condition, that the first suffix inverted binarization method is an exponential-Golomb code manner. Certainly, in some other examples, other different inverted binarization methods may be further set correspondingly for the condition met by the value interval. This is not limited in this embodiment of this disclosure.

In an embodiment, whether the displacement vector difference in the first direction correspondingly has a suffix value is determined based on the first value interval. For example, in a case that the first value interval is a target value interval, it is determined that the displacement vector difference in the first direction has only the corresponding prefix value, and it is determined that the displacement vector difference in the first direction has no corresponding suffix value; and in a case that the first value interval is not the target value interval, it is determined that in addition to the corresponding prefix value, the displacement vector difference in the first direction further correspondingly has a suffix value. The target value interval may be one or more value intervals of the foregoing plurality of candidate value intervals. For example, the target value interval is a value interval of the foregoing plurality of candidate value intervals that has a minimum value range.

In an embodiment, whether the displacement vector difference in the first direction correspondingly has a suffix value is determined based on the prefix value corresponding to the displacement vector difference in the first direction. In a case that the prefix value corresponding to the displacement vector difference in the first direction is less than or equal to a value, it is determined that the displacement vector difference in the first direction has only the corresponding prefix value, and it is determined that the displacement vector difference in the first direction has no corresponding suffix value; and in a case that the prefix value corresponding to the displacement vector difference in the first direction is greater than a value, it is determined that in addition to the corresponding prefix value, the displacement vector difference in the first direction further correspondingly has a suffix value.

The manner of determining whether the displacement vector difference in the first direction correspondingly has a suffix value is not limited in this disclosure, and in addition to the two manners listed above, there may be further other manners. For example, whether the displacement vector difference in the first direction correspondingly has a suffix value is determined based on a particular flag bit included in the bitstream. This is not limited in this disclosure.

Step 803. Perform inverted binarization processing on a binary sign string of a first suffix part in a bitstream with the first suffix inverted binarization method, to obtain the suffix value corresponding to the displacement vector difference in the first direction. For example, decoding processing on a first suffix part in a bitstream may be performed using the determined first suffix decoding method, to obtain the suffix value corresponding to the displacement vector difference in the first direction.

For example, in a case of determining that the first suffix inverted binarization method is a fixed-length code manner, inverted binarization processing is performed on a binary sign string of a first suffix part in a bitstream in the fixed-length code manner, to obtain the suffix value corresponding to the displacement vector difference in the first direction. The quantity of decoding bits of the fixed-length code may be a preset fixed value, or may be a value determined based on the first value interval.

In another example, in a case of determining that the first suffix inverted binarization method is an exponential-Golomb code manner, inverted binarization processing is performed on a binary sign string of a first suffix part in a bitstream in the exponential-Golomb code manner, to obtain the suffix value corresponding to the displacement vector difference in the first direction. The order of the exponential-Golomb code may be a preset fixed value, or may be a value determined based on the first value interval.

Step 804. Determine, based on the prefix value and the suffix value corresponding to the displacement vector difference in the first direction, the displacement vector difference in the first direction.

In an embodiment, the step includes the following several substeps:

1. Determine, based on the prefix value corresponding to the displacement vector difference in the first direction, a first offset value.
2. Determine, based on the first offset value and the suffix value corresponding to the displacement vector difference in the first direction, the absolute value of the displacement vector difference in the first direction.
3. Decode, in a case that the absolute value of the displacement vector difference in the first direction is not 0, the bitstream to obtain a sign of the displacement vector difference in the first direction, and determine, based on the absolute value of the displacement vector difference in the first direction and the sign, the displacement vector difference in the first direction.

Assuming that the displacement vector difference in the first direction is denoted as y, and the absolute value of the displacement vector difference in the first direction is denoted as x, in a case that the sign of the displacement vector difference in the first direction is positive, the displacement vector difference y in the first direction is equal to x; in a case that the sign of the displacement vector difference in the first direction is negative, the displacement vector difference y in the first direction is equal to −x.

4. Directly determine, in a case that the absolute value of the displacement vector difference in the first direction is 0, that the displacement vector difference in the first direction is 0 and it is unnecessary to decode the bitstream to obtain the sign of the displacement vector difference in the first direction.

In an embodiment, the sign of the displacement vector difference is entropy-decoded in the CABAC manner, and has a corresponding context model; or is entropy-decoded in the bypass manner.

Additionally, for different inverted binarization methods, manners of determining the prefix value, the suffix value and the offset value are also correspondingly different. For details, reference may be made to descriptions of related examples in the following embodiments.

Figure 9:
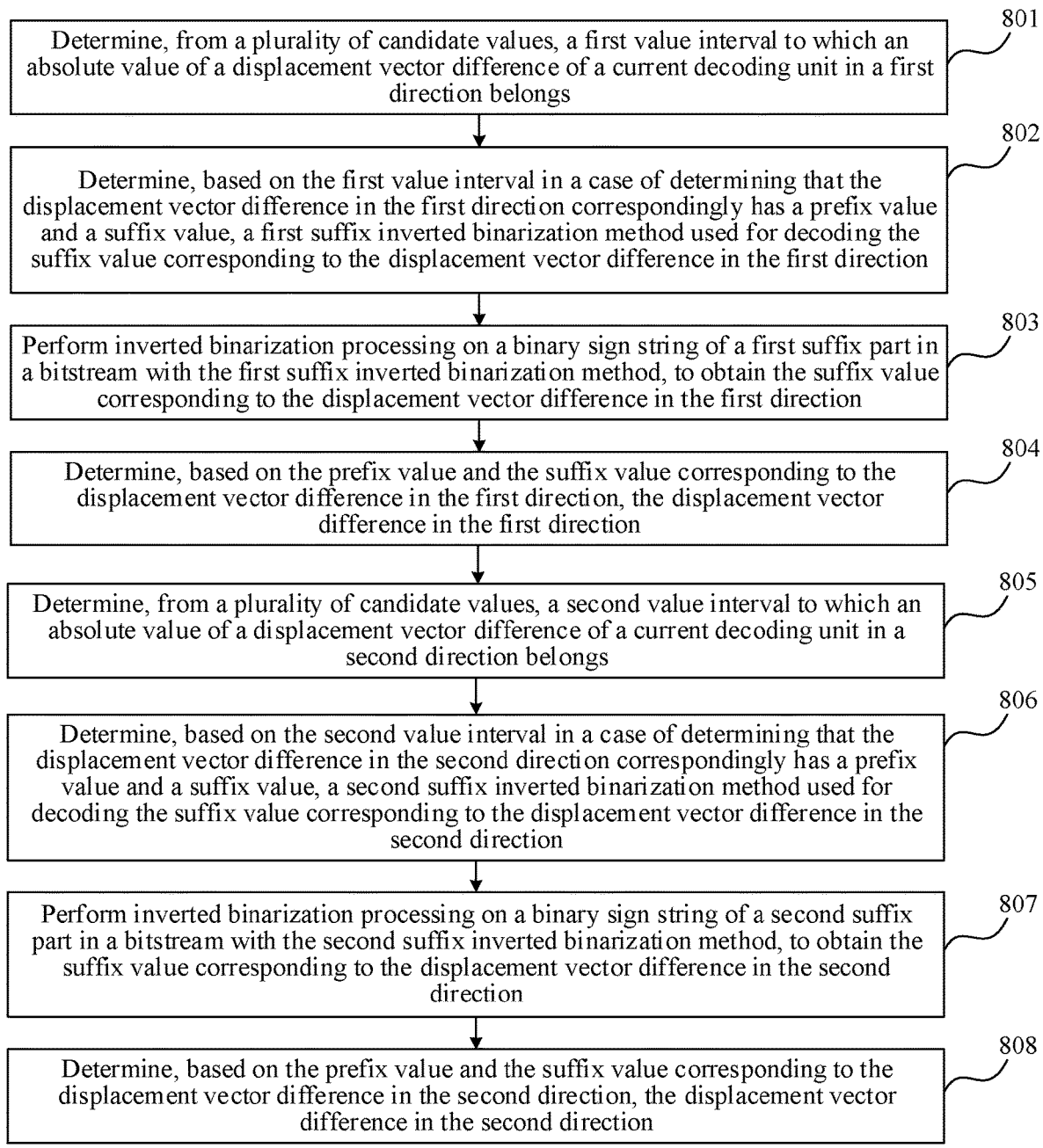

Additionally, the displacement vector difference usually includes components in such two directions as the horizontal direction and the vertical direction. Therefore, as shown in FIG. 9, the video decoding method provided in this disclosure may further include the following several steps (805 to 808):

Step 805. Determine, from a plurality of candidate values, a second value interval to which an absolute value of a displacement vector difference of a current decoding unit in a second direction belongs.

Step 806. Determine, based on the second value interval in a case of determining that the displacement vector difference in the second direction correspondingly has a prefix value and a suffix value, a second suffix inverted binarization method used for decoding the suffix value corresponding to the displacement vector difference in the second direction.

In an embodiment, it is determined, in a case that the second value interval meets a first condition, that the second suffix inverted binarization method is a fixed-length code manner; and it is determined, in a case that the second value interval meets a second condition, that the second suffix inverted binarization method is an exponential-Golomb code manner.

In an embodiment, whether the displacement vector difference in the second direction correspondingly has a suffix value is determined based on the second value interval. For example, in a case that the second value interval is a target value interval, it is determined that the displacement vector difference in the second direction has only the corresponding prefix value, and it is determined that the displacement vector difference in the second direction has no corresponding suffix value; and in a case that the second value interval is not the target value interval, it is determined that in addition to the corresponding prefix value, the displacement vector difference in the second direction further correspondingly has a suffix value. The target value interval may be one or more value intervals of the foregoing plurality of candidate value intervals. For example, the target value interval is a value interval of the foregoing plurality of candidate value intervals that has a minimum value range.

In an embodiment, whether the displacement vector difference in the second direction correspondingly has a suffix value is determined based on the prefix value corresponding to the displacement vector difference in the second direction. In a case that the prefix value corresponding to the displacement vector difference in the second direction is less than or equal to a value, it is determined that the displacement vector difference in the second direction has only the corresponding prefix value, and it is determined that the displacement vector difference in the second direction has no corresponding suffix value; and in a case that the prefix value corresponding to the displacement vector difference in the second direction is greater than a value, it is determined that in addition to the corresponding prefix value, the displacement vector difference in the second direction further correspondingly has a suffix value.

The manner of determining whether the displacement vector difference in the second direction correspondingly has a suffix value is not limited in this disclosure, and in addition to the two manners listed above, there may be further other manners. For example, whether the displacement vector difference in the second direction correspondingly has a suffix value is determined based on a particular flag bit included in the bitstream. This is not limited in this disclosure.

Step 807. Perform inverted binarization processing on a binary sign string of a second suffix part in a bitstream with the second suffix inverted binarization method, to obtain the suffix value corresponding to the displacement vector difference in the second direction.

Step 808. Determine, based on the prefix value and the suffix value corresponding to the displacement vector difference in the second direction, the displacement vector difference in the second direction.

In an embodiment, the step includes the following several substeps:

1. Determine, based on the prefix value corresponding to the displacement vector difference in the second direction, a second offset value.
2. Determine, based on the second offset value and the suffix value corresponding to the displacement vector difference in the second direction, the absolute value of the displacement vector difference in the second direction.

3. Decode, in a case that the absolute value of the displacement vector difference in the second direction is not 0, the bitstream to obtain a sign of the displacement vector difference in the second direction, and determine, based on the absolute value of the displacement vector difference in the second direction and the sign, the displacement vector difference in the second direction.

4. Directly determine, in a case that the absolute value of the displacement vector difference in the second direction is 0, that the displacement vector difference in the second direction is 0 and it is unnecessary to decode the bitstream to obtain the sign of the displacement vector difference in the second direction.

The first direction is a horizontal direction and the second direction is a vertical direction; or the first direction is a vertical direction and the second direction is a horizontal direction.

The method for decoding the displacement vector difference in the second direction is the same as or similar to the foregoing method for decoding the displacement vector difference in the first direction. This is easily conceived based on the foregoing method for decoding the displacement vector difference in the first direction, and details are not described herein again.

In an exemplary embodiment, if entropy coding and entropy decoding are performed on the prefix value corresponding to the displacement vector difference in the second direction with CABAC, a first bit of the prefix value corresponding to the displacement vector difference in the second direction has a first context model and a second context model. In a case that the displacement vector difference in the first direction is first decoded and the displacement vector difference in the second direction is then decoded, determining, based on the first context model in a case that the displacement vector difference in the first direction is 0, a value of the first bit; and determining, based on the second context model in a case that the displacement vector difference in the first direction is not 0, a value of the first bit.

In the embodiments of this disclosure, a probability that the displacement vector difference in the vertical direction (y direction) is 0 if the displacement vector difference in the horizontal direction (x direction) is 0 is relatively high. Therefore, for the displacement vector difference in the vertical direction (y direction), a relatively fine context model is established, that is, two context models are added to the first bit (if the value of the first bit is 0, it indicates that the displacement vector difference in the vertical direction is 0) of the prefix value, and one of the foregoing two context models which is used is determined according to whether the displacement vector difference in the horizontal direction is 0. Through this manner, the quantity of context models may be increased to achieve finer conditional estimation, thereby improving encoding and decoding efficiency.

To sum up, in the technical solution provided in this embodiment of this disclosure, binarization and inverted binarization methods for suffix values corresponding to displacement vector differences are methods determined based on value intervals to which absolute values of the displacement vector differences belong instead of fixed methods. Through this manner, based on distribution characteristics of the absolute values of the displacement vector differences in different value intervals, the binarization and inverted binarization methods that are suitable for the distribution characteristics and have relatively good encoding and decoding performance are designed, thereby facilitating improvement in encoding and decoding efficiency and compression performance.

Figure 10:
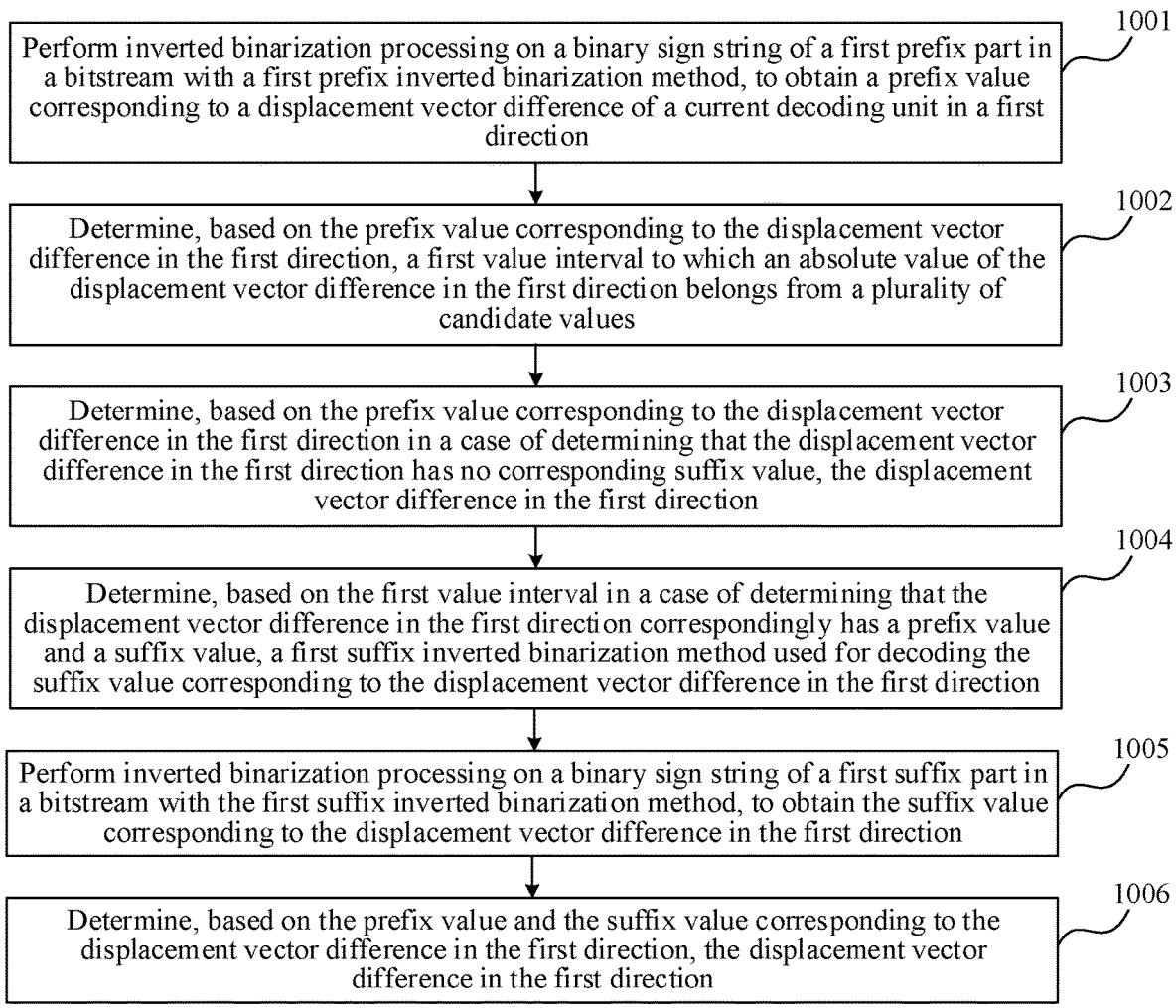

FIG. 10 is a flowchart of a video decoding method according to another embodiment of this disclosure. The method may be applied to a decoder side device. The method may include the following steps (1001 to 1006):

Step 1001. Perform inverted binarization processing on a binary sign string of a first prefix part in a bitstream with a first prefix inverted binarization method, to obtain a prefix value corresponding to a displacement vector difference of a current decoding unit in a first direction.

The first prefix inverted binarization method may be the truncated unary code. Performing inverted binarization processing on a binary sign string of a first prefix part in the bitstream with a truncated unary code manner, to obtain the prefix value corresponding to the displacement vector difference in the first direction.

Step 1002. Determine, based on the prefix value corresponding to the displacement vector difference in the first direction, a first value interval to which an absolute value of the displacement vector difference in the first direction belongs from a plurality of candidate values.

In an embodiment, a plurality of candidate values (or a plurality of candidate value intervals), that is, R0, R1, R2, . . . , and Rn are preset based on a distribution characteristic of the displacement vector difference, where n is a positive integer. An index of an interval Rx is x, the interval Rx may be represented as [Rx_start, Rx_end), and information about the determined interval is shown in the following table 3:

TABLE 3

| Interval $R_x$ | Interval range [$R_x$_start, $R_x$_end) |
| --- | --- |
| $R_0$ | [0, $R_0$_end) |
| $R_1$ | [$R_0$_end, $R_1$_end) |
| $R_2$ | [$R_1$_end, $R_2$_end) |
| $R_3$ | [$R_2$_end, $R_2$_end) |
| . . . | . . . |
| $R_x$ | [$R_{x-1}$_end, $R_x$_end) |
| . . . | |
| $R_{n-1}$ | [$R_{n-2}$_end, $R_{n-1}$_end) |
| $R_n$ | [$R_{n-1}$_end, $R_n$_end) |

Step 1003. Determine, based on the prefix value corresponding to the displacement vector difference in the first direction in a case of determining that the displacement vector difference in the first direction has no corresponding suffix value, the displacement vector difference in the first direction.

Step 1004. Determine, based on the first value interval in a case of determining that the displacement vector difference in the first direction correspondingly has a prefix value and a suffix value, a first suffix inverted binarization method used for decoding the suffix value corresponding to the displacement vector difference in the first direction.

Step 1005. Perform inverted binarization processing on a binary sign string of a first suffix part in a bitstream with the first suffix inverted binarization method, to obtain the suffix value corresponding to the displacement vector difference in the first direction.

Step 1006. Determine, based on the prefix value and the suffix value corresponding to the displacement vector difference in the first direction, the displacement vector difference in the first direction.

In this embodiment, only the method for decoding the displacement vector difference in the first direction is described, the method for decoding the displacement vector difference in the second direction is the same as or similar to this method, and details are not described in this embodiment.

Exemplarily, the method for decoding the displacement vector difference in the first direction is as follows:

1. Perform inverted binarization processing on a binary sign string of a first prefix part in the bitstream with a truncated unary code manner, to obtain the prefix value corresponding to the displacement vector difference in the first direction.

In an embodiment, assuming that the candidate value intervals are partitioned as shown in the foregoing table 3, the truncated value maxVal of the truncated unary code is equal to R_0_end+n−1. Inverted binarization processing is performed on a binary sign string of a first prefix part in the bitstream with a truncated unary code manner, to obtain the prefix value mv_diff_x_abs_bv_pre corresponding to the displacement vector difference in the first direction (denoted as x direction).

In an embodiment, the prefix value mv_diff_x_abs_bv_pre is entropy-decoded in the CABAC manner, and each binary bit has a corresponding context model.

2. Determine, based on the prefix value in a case that the prefix value obtained by step 1 is less than or equal to a first threshold, an absolute value of the displacement vector difference in the first direction.

In a case that the prefix value obtained by step 1 is less than or equal to the first threshold, the prefix value is determined as a first offset value, and the absolute value of the displacement vector difference in the first direction is equal to the first offset value.

The first threshold may be set to R_0_end−1. In a case that mv_diff_x_abs_bv_pre≤R_0_end−1, and the first offset value offset=mv_diff_x_abs_bv_pre, the absolute value of the displacement vector difference in the first direction, namely, mv_diff_x_abs_bv=offset.

3. Determine, based on the prefix value in a case that the prefix value obtained by step 1 is greater than the first threshold and less than the second threshold, the first value interval to which the absolute value of the displacement vector difference in the first direction belongs; determine, based on the first value interval, the quantity n of decoding bits of the fixed-length code, where n is a positive integer; perform inverted binarization processing on a binary sign string of a first suffix part in the bitstream with the n-bit fixed-length code manner, to obtain the suffix value corresponding to the displacement vector difference in the first direction; and determine, based on the prefix value and the suffix value, the absolute value of the displacement vector difference in the first direction.

The second threshold may be set to R_0_end+n−1. In a case that R_0_end−1<mv_diff_x_abs_bv_pre<R_0_end+n−1, that is, mv_diff_x_abs_bv_pre=R_0_end+x−1 (x=1 to n−1), a value of mv_diff_x_abs_bv belongs to an interval R_x=[R_(x−1)_end, R_x_end). If the first offset value offset=R_(x−1)_end, len=Ceil(log 2(R_x_end−R_(x−1)_end)) bits are entropy-decoded from the bitstream, and inverted binarization and deduction are performed according to the len-bit fixed-length code manner to obtain the suffix value mv_diff_x_abs_bv_suf corresponding to the displacement vector difference in the first direction, the absolute value of the displacement vector difference in the first direction, namely, mv_diff_x_abs_bv=offset+mv_diff_x_abs_bv_suf.

As an alternative solution, inverted binarization may be further performed on the suffix value in the following manner:

(1) performing inverted binarization on the suffix value according to the k-order exponential-Golomb code manner;

(2) performing inverted binarization on the suffix value according to the truncated unary code (truncated value maxVal=R_x_end-offset−1) manner; and (3) performing inverted binarization on the suffix value according to the unary code manner.

4. Decode, in a case that the prefix value obtained by step 1 is equal to the second threshold, the bitstream to obtain a parity identifier, where the parity identifier is used for indicating parity of the absolute value of the displacement vector difference in the first direction; perform inverted binarization processing on a binary sign string of a first suffix part in the bitstream with the k-order exponential-Golomb code manner, to obtain the suffix value corresponding to the displacement vector difference in the first direction, where k is an integer greater than or equal to 0; and determine, based on the prefix value, the parity identifier and the suffix value, the absolute value of the displacement vector difference in the first direction.

In a case that mv_diff_x_abs_bv_pre=R_0_end+n−1, a value of mv_diff_x_abs_bv belongs to an interval R_n=(R_(n−1)_end, R_n_end). The first offset value offset=R_(n−1)_end, and 1 bit continues to be decoded from the bitstream to obtain an identifier mv_diff_x_abs_bv_parity indicating parity of mv_diff_x_abs_bv; after the value of mv_diff_x_abs_bv_parity is obtained, if entropy decoding continues to be performed from the bitstream, and inverted binarization is performed according to the k-order exponential-Golomb code manner to obtain mv_diff_x_abs_bv_k_eg, mv_diff_x_abs_bv=offset+mv_diff_x_abs_bv_parity+2*mv_diff_x_abs_bv_k_eg.

In an embodiment, the parity identifier mv_diff_x_abs_bv_parity is entropy-decoded in the CABAC manner, and has a corresponding context model; or the parity identifier mv_diff_x_abs_bv_parity is entropy-decoded in the bypass manner.

In an embodiment, the order of the exponential-Golomb code is k=0 to 5.

Then, using R_0=[0, 5), R_1=[5, 9), R_2=[9, 17), R_3=[17, 33), and R_4=[33, ∞), that is, n=4, x=0 to 4, and R_0_end=5 as an example, an exemplary description is made as follows:

1. For the displacement vector difference value, first determine a series of candidate value intervals whose values are integers, which are denoted as R_0=[0, 5), R_1=[5, 9), R_2=[9, 17), R_3=[17, 33), and R_4=[33, ∞).

2. Perform decoding and inverted binarization according to the truncated unary code manner (truncated value maxVal=5+4−1=8) from the bitstream to obtain the prefix value mv_diff_x_abs_bv_pre, where in a case that mv_diff_x_abs_bv_pre is less than or equal to 4, and offset is equal to mv_diff_x_abs_bv_pre, mv_diff_x_abs_bv=offset.

3. Otherwise, in a case that mv_diff_x_abs_bv_pre is equal to 5 (x=1), the value of mv_diff_x_abs_bv belongs to the interval R_1=[5, 9). If the offset is equal to 5, 2 bits are entropy-decoded from the bitstream, and inverted binarization and deduction are performed according to the 2-bit fixed-length code manner to obtain the suffix value mv_diff_x_abs_bv_suf, mv_diff_x_abs_bv=offset+mv_diff_x_abs_bv_suf.

4. Otherwise, in a case that mv_diff_x_abs_bv_pre is equal to 6 (x=2), the value of mv_diff_x_abs_bv belongs to the interval R_2=[9, 17). If the offset is equal to 9, 3 bits are entropy-decoded from the bitstream, and inverted binarization and deduction are performed according to the 3-bit fixed-length code manner to obtain the suffix value mv_diff_x_abs_bv_suf, mv_diff_x_abs_bv=offset+mv_diff_x_abs_bv_suf.

5. Otherwise, in a case that mv_diff_x_abs_bv_pre is equal to 7 (x=3), the value of mv_diff_x_abs_bv belongs to the interval R_3=[17, 33). If the offset is equal to 17, 4 bits are entropy-decoded from the bitstream, and inverted binarization and deduction are performed according to the 4-bit fixed-length code manner to obtain the suffix value mv_diff_x_abs_bv_suf, mv_diff_x_abs_bv=offset+mv_diff_x_abs_bv_suf.

6. Otherwise, in a case that mv_diff_x_abs_bv_pre is equal to 5+4−1=8, the value of mv_diff_x_abs_bv belongs to the interval R_4=[33, ∞). The offset=33, and 1 bit continues to be decoded from the bitstream to obtain an identifier mv_diff_x_abs_bv_parity indicating parity of mv_diff_x_abs_bv; after the value of mv_diff_x_abs_bv_parity is obtained, if entropy decoding continues to be performed from the bitstream, and inverted binarization is performed according to the k-order exponential-Golomb code manner to obtain mv_diff_x_abs_bv_k_eg, mv_diff_x_abs_bv=offset+mv_diff_x_abs_bv_parity+2*mv_diff_x_abs_bv_k_eg.

Figure 11:
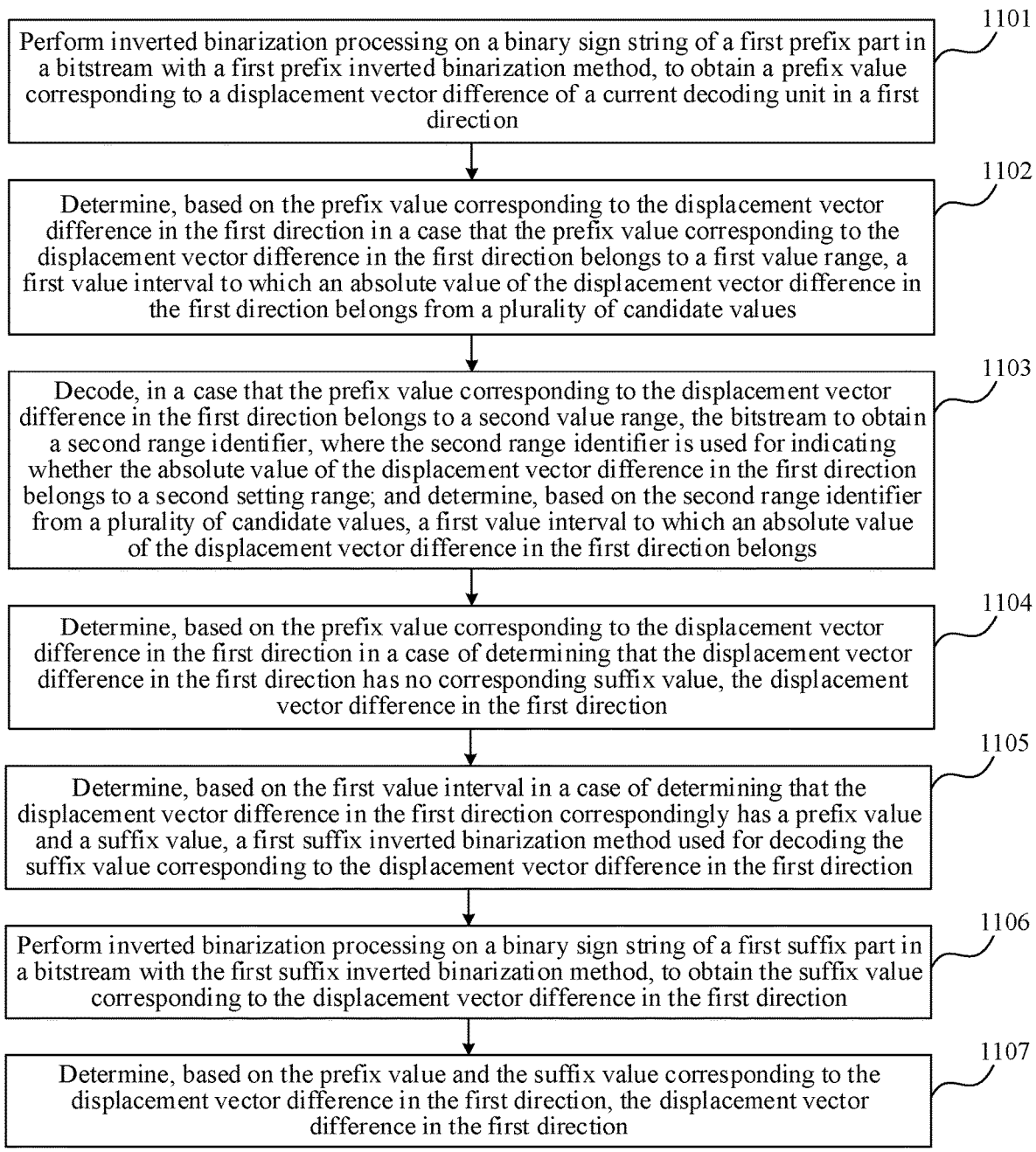

FIG. 11 is a flowchart of a video decoding method according to another embodiment of this disclosure. The method may be applied to a decoder side device. The method may include the following steps (1101 to 1107):

Step 1101. Perform inverted binarization processing on a binary sign string of a first prefix part in a bitstream with a first prefix inverted binarization method, to obtain a prefix value corresponding to a displacement vector difference of a current decoding unit in a first direction.

The first prefix inverted binarization method may be the truncated unary code. Performing inverted binarization processing on a binary sign string of a first prefix part in the bitstream with a truncated unary code manner, to obtain the prefix value corresponding to the displacement vector difference in the first direction.

Step 1102. Determine, based on the prefix value corresponding to the displacement vector difference in the first direction in a case that the prefix value corresponding to the displacement vector difference in the first direction belongs to a first value range, a first value interval to which an absolute value of the displacement vector difference in the first direction belongs from a plurality of candidate values.

Step 1103. Decode, in a case that the prefix value corresponding to the displacement vector difference in the first direction belongs to a second value range, the bitstream to obtain a second range identifier, where the second range identifier is used for indicating whether the absolute value of the displacement vector difference in the first direction belongs to a second setting range; and determine, based on the second range identifier from a plurality of candidate values, a first value interval to which an absolute value of the displacement vector difference in the first direction belongs.

Step 1104. Determine, based on the prefix value corresponding to the displacement vector difference in the first direction in a case of determining that the displacement vector difference in the first direction has no corresponding suffix value, the displacement vector difference in the first direction.

Step 1105. Determine, based on the first value interval in a case of determining that the displacement vector difference in the first direction correspondingly has a prefix value and a suffix value, a first suffix inverted binarization method used for decoding the suffix value corresponding to the displacement vector difference in the first direction.

Step 1106. Perform inverted binarization processing on a binary sign string of a first suffix part in a bitstream with the first suffix inverted binarization method, to obtain the suffix value corresponding to the displacement vector difference in the first direction.

Step 1107. Determining, based on the prefix value and the suffix value corresponding to the displacement vector difference in the first direction, the displacement vector difference in the first direction.

In this embodiment, only the method for decoding the displacement vector difference in the first direction is described, the method for decoding the displacement vector difference in the second direction is the same as or similar to this method, and details are not described in this embodiment.

Exemplarily, the method for decoding the displacement vector difference in the first direction is as follows:

1. Perform inverted binarization processing on a binary sign string of a first prefix part in the bitstream with a truncated unary code manner, to obtain the prefix value corresponding to the displacement vector difference in the first direction.

In an embodiment, the truncated value of the truncated unary code, namely, maxVal=T+1, where T is an integer is greater than or equal to 0. Inverted binarization processing is performed on a binary sign string of a first prefix part in the bitstream with a truncated unary code manner, to obtain the prefix value mv_diff_x_abs_bv_pre corresponding to the displacement vector difference in the first direction (denoted as x direction).

In an embodiment, the prefix value mv_diff_x_abs_bv_pre is entropy-decoded in the CABAC manner, and each binary bit has a corresponding context model.

2. Determine, based on the prefix value in a case that the prefix value obtained by step 1 is less than or equal to T, an absolute value of the displacement vector difference in the first direction.

In a case that the prefix value obtained by step 1 is less than or equal to T, the prefix value is determined as a first offset value, and the absolute value of the displacement vector difference in the first direction is equal to the first offset value.

In a case that mv_diff_x_abs_bv_pre≤T, and the first offset value offset=mv_diff_x_abs_bv_pre, the absolute value of the displacement vector difference in the first direction, namely, mv_diff_x_abs_bv=offset.

3. In a case that the prefix value obtained by step 1 is equal to T+1, decode the bitstream to obtain a second range identifier, where the second range identifier is used for indicating whether the absolute value of the displacement vector difference in the first direction belongs to a second setting range.

In a case that mv_diff_x_abs_bv_pre=T+1, 1 bit continues to be decoded from the bitstream to obtain a range identifier mv_diff_x_abs_bv_less_M_flag, where the range identifier mv_diff_x_abs_bv_less_M_flag is used for indicating whether mv_diff_x_abs_bv is less than M, and M is an integer greater than T. For example, T=0 to 32, and M=3 to 65.

In an embodiment, the range identifier mv_diff_x_abs_bv_less_M_flag is entropy-decoded in the CABAC manner, and has a corresponding context model; or the range identifier mv_diff_x_abs_bv_less_M_flag is entropy-decoded in the bypass manner.

4. Determine, based on the second setting range in a case of determining based on the second range identifier that the absolute value of the displacement vector difference in the first direction belongs to the second setting range, the quantity n of decoding bits of the fixed-length code, where n is a positive integer; perform inverted binarization processing on a binary sign string of a first suffix part in the bitstream with the n-bit fixed-length code manner, to obtain the suffix value corresponding to the displacement vector difference in the first direction; and determine, based on the prefix value and the suffix value, the absolute value of the displacement vector difference in the first direction.

In a case that mv_diff_x_abs_bv_less_M_flag is equal to 1, len=Ceil(log 2(M−T−1)) bits are entropy-decoded from the bitstream, and inverted binarization and deduction are performed according to the len-bit fixed-length code manner to obtain the suffix value mv_diff_x_abs_bv_suf corresponding to the displacement vector difference in the first direction, mv_diff_x_abs_bv=mv_diff_x_abs_bv_suf+mv_diff_x_abs_bv_pre.

As an alternative solution, inverted binarization may be further performed on the suffix value in the following manner:
(1) performing inverted binarization on the suffix value according to the k-order exponential-Golomb code manner;
(2) performing inverted binarization on the suffix value according to the truncated unary code (truncated value maxVal=M−T−2) manner; and
(3) performing inverted binarization on the suffix value according to the unary code manner.

5. Decode, in a case of determining based on the second range identifier that the absolute value of the displacement vector difference in the first direction does not belong to the second setting range, the bitstream to obtain a parity identifier, where the parity identifier is used for indicating parity of the absolute value of the displacement vector difference in the first direction; perform inverted binarization processing on a binary sign string of a first suffix part in the bitstream with the k-order exponential-Golomb code manner, to obtain the suffix value corresponding to the displacement vector difference in the first direction, where k is an integer greater than or equal to 0; and determine, based on the prefix value, the parity identifier and the suffix value, the absolute value of the displacement vector difference in the first direction.

In a case that mv_diff_x_abs_bv_less_M_flag is equal to 0, 1 bit continues to be decoded from the bitstream to obtain an identifier mv_diff_x_abs_bv_parity indicating parity of mv_diff_x_abs_bv; and after the value of mv_diff_x_abs_bv_parity is obtained, if entropy decoding continues to be performed from the bitstream, and inverted binarization is performed according to the k-order exponential-Golomb code manner to obtain mv_diff_x_abs_bv_k_eg, mv_diff_x_abs_bv=M+mv_diff_x_abs_bv_parity+2*mv_diff_x_abs_bv_k_eg.

In an embodiment, the parity identifier mv_diff_x_abs_bv_parity is entropy-decoded in the CABAC manner, and has a corresponding context model; or the parity identifier mv_diff_x_abs_bv_parity is entropy-decoded in the bypass manner.

In an embodiment, the order of the exponential-Golomb code is k=0 to 5.

The following provides a description by using an example in which T=4 and M=9:
1. Perform decoding and inverted binarization according to the truncated unary code manner (truncated value maxVal=5) from the bitstream to obtain the prefix value mv_diff_x_abs_bv_pre, where in a case that mv_diff_x_abs_bv_pre is less than or equal to 4, mv_diff_x_abs_bv=mv_diff_x_abs_bv_pre.

2. Otherwise, mv_diff_x_abs_bv_pre is equal to 5, 1 bit continues to be decoded from the bitstream to obtain mv_diff_x_abs_bv_less_M_flag.

3. In a case that mv_diff_x_abs_bv_less_M_flag is equal to 1, len=2 bits are entropy-decoded from the bitstream, inverted binarization and deduction are performed according to the 2-bit fixed-length code manner to obtain the suffix value mv_diff_x_abs_bv_suf, and mv_diff_x_abs_bv=mv_diff_x_abs_bv_suf+mv_diff_x_abs_bv_pre.

4. Otherwise, if 1 bit continues to be decoded from the bitstream to obtain an identifier mv_diff_x_abs_bv_parity indicating parity of mv_diff_x_abs_bv; and then entropy decoding continues to be performed from the bitstream, and inverted binarization is performed according to the k-order exponential-Golomb code manner to obtain mv_diff_x_abs_bv_k_eg, mv_diff_x_abs_bv=M+mv_diff_x_abs_bv_parity+2*mv_diff_x_abs_bv_k_eg.

Figure 12:
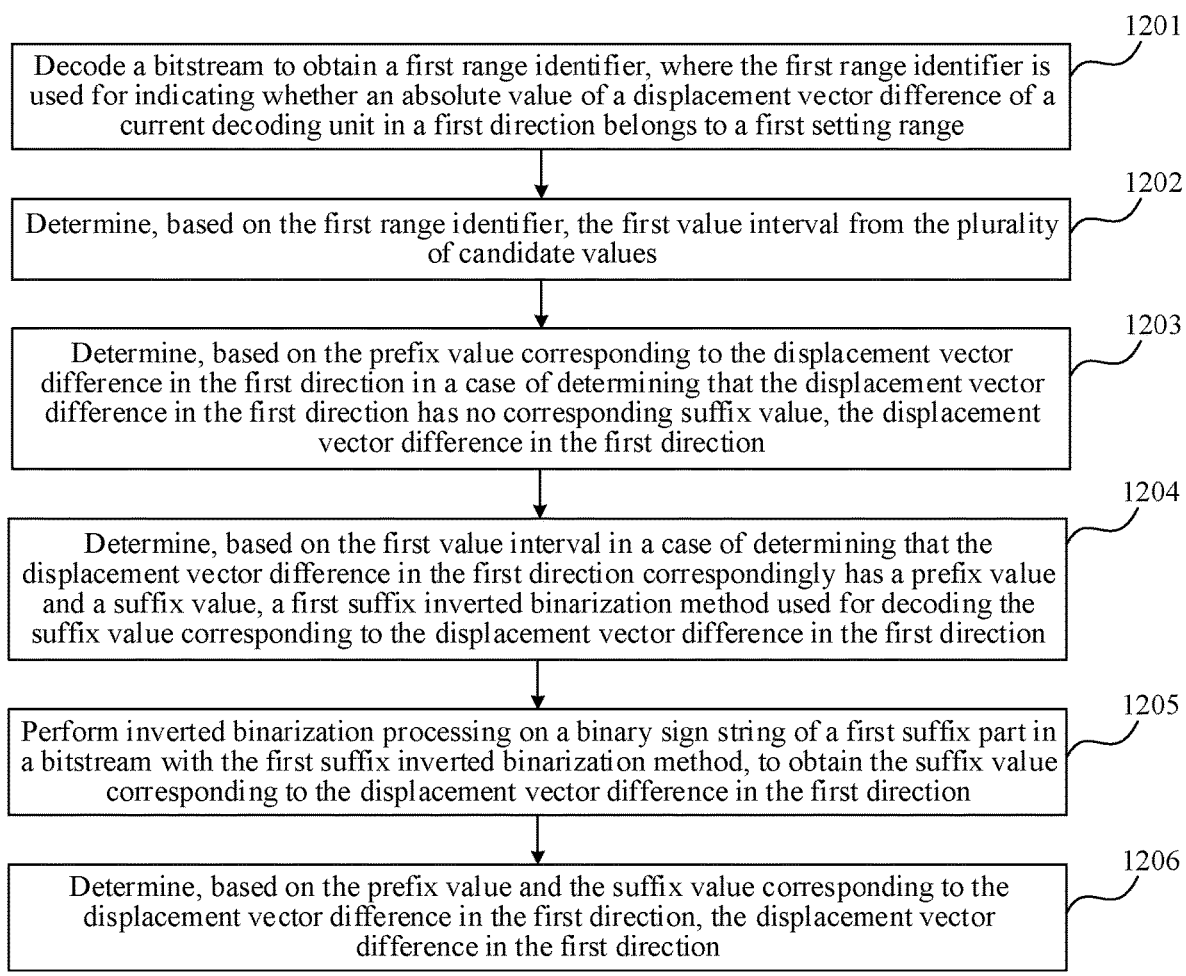

FIG. 12 is a flowchart of a video decoding method according to another embodiment of this disclosure. The method may be applied to a decoder side device. The method may include the following steps (1201 to 1206):

Step 1201. Decode a bitstream to obtain a first range identifier, where the first range identifier is used for indicating whether an absolute value of a displacement vector difference of a current decoding unit in a first direction belongs to a first setting range.

Step 1202. Determining, based on the first range identifier, the first value interval from the plurality of candidate values.

Step 1203. Determine, based on the prefix value corresponding to the displacement vector difference in the first direction in a case of determining that the displacement vector difference in the first direction has no corresponding suffix value, the displacement vector difference in the first direction.

Step 1204. Determine, based on the first value interval in a case of determining that the displacement vector difference in the first direction correspondingly has a prefix value and a suffix value, a first suffix inverted binarization method used for decoding the suffix value corresponding to the displacement vector difference in the first direction.

Step 1205. Perform inverted binarization processing on a binary sign string of a first suffix part in a bitstream with the first suffix inverted binarization method, to obtain the suffix value corresponding to the displacement vector difference in the first direction.

Step 1206. Determining, based on the prefix value and the suffix value corresponding to the displacement vector difference in the first direction, the displacement vector difference in the first direction.

In this embodiment, only the method for decoding the displacement vector difference in the first direction is described, the method for decoding the displacement vector difference in the second direction is the same as or similar to this method, and details are not described in this embodiment.

Exemplarily, the method for decoding the displacement vector difference in the first direction is as follows:
1. Decode a bitstream to obtain a first range identifier, where the first range identifier is used for indicating whether an absolute value of a displacement vector difference of a current decoding unit in a first direction belongs to a first setting range.

For example, 1 bit is decoded from the bitstream to obtain a value of a range identifier mv_diff_x_abs_bv_less_M_flag, where the range identifier mv_diff_x_abs_bv_less_M_flag is used for indicating whether mv_diff_x_abs_bv is less than M, and M is an integer greater than 0, for example, M=1 to 65.

In an embodiment, the range identifier mv_diff_x_abs_bv_less_M_flag is entropy-decoded in the CABAC manner, and has a corresponding context model; or the range identifier mv_diff_x_abs_bv_less_M_flag is entropy-decoded in the bypass manner.

2. Perform, in a case of determining based on the first range identifier that the absolute value of the displacement vector difference in the first direction belongs to the first setting range, inverted binarization processing on a binary sign string of a first prefix part in the bitstream with a truncated unary code manner, to obtain the prefix value corresponding to the displacement vector difference in the first direction; and determine, based on the prefix value, the displacement vector difference in the first direction.

In a case that mv_diff_x_abs_bv_less_M_flag is equal to 1, decoding and inverted binarization are performed from the bitstream according to the truncated unary code manner (truncated value is M−1) to obtain mv_diff_x_abs_bv.

In an embodiment, mv_diff_x_abs_bv is entropy-decoded in the CABAC manner, and each binary bit has a corresponding context model.

As an alternative solution, entropy decoding and inverted binarization may be further performed according to one of the following manners to obtain mv_diff_x_abs_bv:
 (1) performing inverted binarization according to the unary code manner;
 (2) performing inverted binarization according to the len-bit fixed-length code method, where len=Ceil(log 2(M)); and
 (3) performing inverted binarization according to the k-order exponential-Golomb code manner.

3. Decode, in a case of determining based on the first range identifier that the absolute value of the displacement vector difference in the first direction does not belong to the first setting range, the bitstream to obtain a parity identifier, where the parity identifier is used for indicating parity of the absolute value of the displacement vector difference in the first direction; perform inverted binarization processing on a binary sign string of a first suffix part in the bitstream with the k-order exponential-Golomb code manner, to obtain the suffix value corresponding to the displacement vector difference in the first direction, where k is an integer greater than or equal to 0; and determine, based on the prefix value, the parity identifier and the suffix value, the absolute value of the displacement vector difference in the first direction.

In a case that mv_diff_x_abs_bv_less_M_flag is equal to 0, 1 bit continues to be decoded from the bitstream to obtain an identifier mv_diff_x_abs_bv_parity indicating parity of mv_diff_x_abs_bv; and after the value of mv_diff_x_abs_bv_parity is obtained, if entropy decoding continues to be performed from the bitstream, and inverted binarization is performed according to the k-order exponential-Golomb code manner to obtain mv_diff_x_abs_bv_k_eg, mv_diff_x_abs_bv=M+mv_diff_x_abs_bv_parity+2*mv_diff_x_abs_bv_k_eg.

In an embodiment, the parity identifier mv_diff_x_abs_bv_parity is entropy-decoded in the CABAC manner, and has a corresponding context model; or the parity identifier mv_diff_x_abs_bv_parity is entropy-decoded in the bypass manner.

In an embodiment, the order of the exponential-Golomb code is k=0 to 5.

Figure 13:
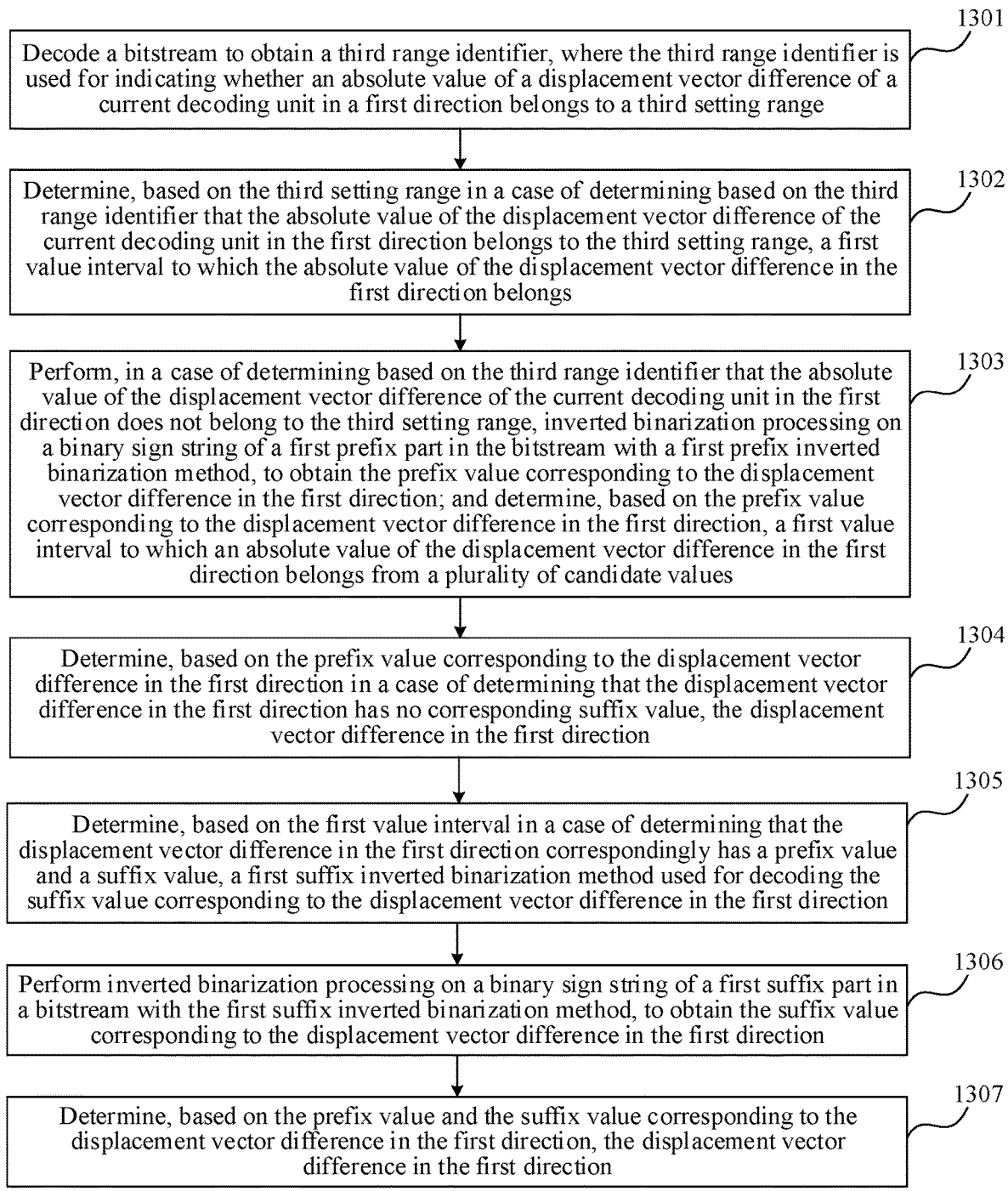

FIG. 13 is a flowchart of a video decoding method according to another embodiment of this disclosure. The method may be applied to a decoder side device. The method may include the following steps (1301 to 1307):

Step 1301. Decode a bitstream to obtain a third range identifier, where the third range identifier is used for indicating whether an absolute value of a displacement vector difference of a current decoding unit in a first direction belongs to a third setting range.

Step 1302. Determine, based on the third setting range in a case of determining based on the third range identifier that the absolute value of the displacement vector difference of the current decoding unit in the first direction belongs to the third setting range, a first value interval to which the absolute value of the displacement vector difference in the first direction belongs.

Step 1303. Perform, in a case of determining based on the third range identifier that the absolute value of the displacement vector difference of the current decoding unit in the first direction does not belong to the third setting range, inverted binarization processing on a binary sign string of a first prefix part in the bitstream with a first prefix inverted binarization method, to obtain the prefix value corresponding to the displacement vector difference in the first direction; and determine, based on the prefix value corresponding to the displacement vector difference in the first direction, a first value interval to which an absolute value of the displacement vector difference in the first direction belongs from a plurality of candidate values.

Step 1304. Determine, based on the prefix value corresponding to the displacement vector difference in the first direction in a case of determining that the displacement vector difference in the first direction has no corresponding suffix value, the displacement vector difference in the first direction.

Step 1305. Determine, based on the first value interval in a case of determining that the displacement vector difference in the first direction correspondingly has a prefix value and a suffix value, a first suffix inverted binarization method used for decoding the suffix value corresponding to the displacement vector difference in the first direction.

Step 1306. Perform inverted binarization processing on a binary sign string of a first suffix part in a bitstream with the first suffix inverted binarization method, to obtain the suffix value corresponding to the displacement vector difference in the first direction.

Step 1307. Determine, based on the prefix value and the suffix value corresponding to the displacement vector difference in the first direction, the displacement vector difference in the first direction.

In this embodiment, only the method for decoding the displacement vector difference in the first direction is described, the method for decoding the displacement vector difference in the second direction is the same as or similar to this method, and details are not described in this embodiment.

Exemplarily, the method for decoding the displacement vector difference in the first direction is as follows:

a plurality of candidate values (or a plurality of candidate value intervals), that is, R0, R1, R2, . . . , and Rn are preset based on a distribution characteristic of the displacement vector difference, where n is a positive integer. An index of an interval Rx is x, the interval Rx may be represented as [Rx_start, Rx_end), and information about the determined interval may be shown in the foregoing table 3.

1. Decode a bitstream to obtain a third range identifier, where the third range identifier is used for indicating whether an absolute value of a displacement vector difference of a current decoding unit in a first direction belongs to a third setting range.

For example, 1 bit is decoded from the bitstream to obtain a value of a range identifier mv_diff_x_abs_bv_M_to_N_flag, where the range identifier mv_diff_x_abs_bv_M_to_N_flag is used for indicating whether mv_diff_x_abs_bv belongs to an interval [M, N), and M and N are both preset values and are related to a preset candidate value interval Rt. Using the table 3 as an example, t is an interval index, that is, M=Rt−1_end, and N=Rt_end.

In an embodiment, the range identifier mv_diff_x_abs_bv_M_to_N_flag is entropy-decoded in the CABAC manner, and has a corresponding context model; or the range identifier mv_diff_x_abs_bv_M_to_N_flag is entropy-decoded in the bypass manner.

2. Determine, based on the third setting range in a case of determining based on the third range identifier that the absolute value of the displacement vector difference in the first direction belongs to the third setting range, the quantity n of decoding bits of the fixed-length code, where n is a positive integer; perform inverted binarization processing on a binary sign string of a first suffix part in the bitstream with the n-bit fixed-length code manner, to obtain the suffix value corresponding to the displacement vector difference in the first direction; and determine, based on the prefix value (or the first offset value) and the suffix value, the absolute value of the displacement vector difference in the first direction.

In a case that mv_diff_x_abs_bv_M_to_N_flag is equal to 1, the first offset value offset is equal to M, len=Ceil(log 2(N−M)) bits are entropy-decoded from the bitstream, and inverted binarization and deduction are performed according to the len-bit fixed-length code manner to obtain the suffix value mv_diff_x_abs_bv_suf, mv_diff_x_abs_bv=mv_diff_x_abs_bv_suf+offset.

3. Perform, in a case of determining based on the third range identifier that the absolute value of the displacement vector difference in the first direction does not belong to the third setting range, inverted binarization processing on a binary sign string of a first prefix part in the bitstream with a truncated unary code manner, to obtain the prefix value.

In a case that mv_diff_x_abs_bv_M_to_N_flag is equal to 0, decoding and inverted binarization are performed from the bitstream according to the truncated unary code manner (truncated value maxVal=R_0_end+n−2) to obtain the prefix value mv_diff_x_abs_bv_pre.

In an embodiment, the prefix value mv_diff_x_abs_bv_pre is entropy-decoded in the CABAC manner, and each binary bit has a corresponding context model.

4. Determine, based on the prefix value in a case that the prefix value is less than or equal to a first threshold, an absolute value of the displacement vector difference in the first direction.

In a case that mv_diff_x_abs_bv_pre is less than or equal to R_0_end−1, and the first offset value offset is equal to mv_diff_x_abs_bv_pre, mv_diff_x_abs_bv=offset.

5. Determine, based on the prefix value in a case that the prefix value is greater than the first threshold and less than the second threshold, the first value interval to which the absolute value of the displacement vector difference in the first direction belongs; determine, based on the first value interval, the quantity n of decoding bits of the fixed-length code, where n is a positive integer; perform inverted binarization processing on a binary sign string of a first suffix part in the bitstream with the n-bit fixed-length code manner, to obtain the suffix value; and determine, based on the prefix value and the suffix value, the absolute value of the displacement vector difference in the first direction.

In a case that mv_diff_x_abs_bv_pre is equal to R_0_end+x−1, a value of mv_diff_x_abs_bv belongs to an interval R_x=[R (x−1) end, R_x_end), and x<t (x=1 to t−1). If the offset is equal to R (x−1) end, len=Ceil(log 2(R_x_end−R (x−1) end)) bits are entropy-decoded from the bitstream, and inverted binarization and deduction are performed according to the len-bit fixed-length code manner to obtain the suffix value mv_diff_x_abs_bv_suf, mv_diff_x_abs_bv=mv_diff_x_abs_bv_suf+offset.

In a case that mv_diff_x_abs_bv_pre is equal to R_0_end+x−2, a value of mv_diff_x_abs_bv belongs to an interval R_x=[R (x−1) end, R_x_end), and x>t (x=t+1 to n−1). If the offset is equal to R_(x−1) end, len=Ceil(log 2(R_x_end−R_(x−1) end)) bits are entropy-decoded from the bitstream, and inverted binarization and deduction are performed according to the len-bit fixed-length code manner to obtain the suffix value mv_diff_x_abs_bv_suf, mv_diff_x_abs_bv=mv_diff_x_abs_bv_suf+offset.

As an alternative solution, entropy decoding and inverted binarization may be performed on the suffix value mv_diff_x_abs_bv_suf according to one of the following manners and its value may be deduced:

(1) performing inverted binarization on the suffix value mv_diff_x_abs_bv_suf according to the k-order exponential-Golomb code manner;

(2) performing inverted binarization on the suffix value mv_diff_x_abs_bv_suf according to the truncated unary code (truncated value maxVal=R_x_end-offset−1) manner; and (3) performing inverted binarization on the suffix value mv_diff_x_abs_bv_suf according to the unary code manner.

6. Decode, in a case that the prefix value is equal to the second threshold, the bitstream to obtain a parity identifier, where the parity identifier is used for indicating parity of the absolute value of the displacement vector difference in the first direction; perform inverted binarization processing on a binary sign string of a first suffix part in the bitstream with the k-order exponential-Golomb code manner, to obtain the suffix value, where k is an integer greater than or equal to 0; and determine, based on the prefix value, the parity identifier and the suffix value, the absolute value of the displacement vector difference in the first direction.

In a case that mv_diff_x_abs_bv_pre is equal to R_0_end+n−2 (x=n), a value of mv_diff_x_abs_bv belongs to an interval R (n−1) end, R_n_end). The offset=R_(n−1) end, and 1 bit continues to be decoded from the bitstream to obtain an identifier mv_diff_x_abs_bv_parity indicating parity of mv_diff_x_abs_bv; after the value of mv_diff_x_abs_bv_parity is obtained, if entropy decoding continues to be performed from the bitstream, and inverted binarization is performed according to the k-order exponential-Golomb code manner to obtain mv_diff_x_abs_bv_k_eg, mv_diff_x_abs_bv=offset+mv_diff_x_abs_bv_parity+2*mv_diff_x_abs_bv_k_eg.

In an embodiment, the parity identifier mv_diff_x_abs_bv_parity is entropy-decoded in the CABAC manner, and has a corresponding context model; or the parity identifier mv_diff_x_abs_bv_parity is entropy-decoded in the bypass manner.

In an embodiment, the order of the exponential-Golomb code is k=0 to 5.

Then, using R_0=[0, 5), R_1=[5, 9), R_2=[9, 17), and R_3=[17, ∞), that is, n=3, x=0 to 3, and R_0_end=5 as an example, an exemplary description is made as follows:

1. For the motion difference value, first determine a series of intervals whose values are integers, which are denoted as R_0=[0, 5), R_1=[5, 9), R_2=[9, 17), and R_3=[17, ∞), where t=2, and x=0 to 3.

2. Entropy-decode 1 bit from the bitstream to obtain mv_diff_x_abs_bv_9_to_17_flag 3. In a case that mv_diff_x_abs_bv_9_to_17_flag is equal to 1, the offset is equal to 9, 3 bits are entropy-decoded from the bitstream, and inverted binarization and deduction are performed according to the 3-bit fixed-length code manner to obtain the suffix value mv_diff_x_abs_bv_suf, mv_diff_x_abs_bv is equal to mv_diff_x_abs_bv_suf+offset.

4. Otherwise, perform decoding and inverted binarization according to the truncated unary code manner (truncated value maxVal=6) from the bitstream to obtain the prefix value mv_diff_x_abs_bv_pre, where in a case that mv_diff_x_abs_bv_pre is less than or equal to 4, and offset is equal to mv_diff_x_abs_bv_pre, mv_diff_x_abs_bv is equal to offset.

5. Otherwise, in a case that mv_diff_x_abs_bv_pre is equal to 5 (x=1), the value of mv_diff_x_abs_bv belongs to the interval R_1=[5, 9). If offset=5, 2 bits are entropy-decoded from the bitstream, and inverted binarization and deduction are performed according to the 2-bit fixed-length code manner to obtain the suffix value mv_diff_x_abs_bv_suf, mv_diff_x_abs_bv is equal to mv_diff_x_abs_bv_suf+offset.

6. Otherwise, in a case that mv_diff_x_abs_bv_pre is equal to 6, the value of mv_diff_x_abs_bv belongs to the interval R_n=[17, ∞). The offset=17, and 1 bit continues to be decoded from the bitstream to obtain an identifier mv_diff_x_abs_bv_parity indicating parity of mv_diff_x_abs_bv; after the value of mv_diff_x_abs_bv_parity is obtained, if entropy decoding continues to be performed from the bitstream, and inverted binarization is performed according to the k-order exponential-Golomb code manner to obtain mv_diff_x_abs_bv_k_eg, mv_diff_x_abs_bv=offset+mv_diff_x_abs_bv_parity+2*mv_diff_x_abs_bv_k_eg.

In the embodiments of this disclosure, a plurality of manners are provided to determine a value interval to which an absolute value of a displacement vector difference belongs from a plurality of candidate value intervals. During actual application, an appropriate manner may be selected with reference to a prediction method used in the solution or a distribution characteristic of the displacement vector difference. This is not limited in this embodiment of this disclosure.

Additionally, in the foregoing embodiment, a plurality of binarization and inverted binarization methods such as the truncated unary code, the fixed-length code, the exponential-Golomb code, and the unary code are used.

The following table 4 and table 5 show a relationship between synElVal and a binary sign string in two forms of truncated unary codes.

TABLE 4

| synElVal | Binary sign string | | | | |
|---|---|---|---|---|---|
| 0 | 1 | | | | |
| 1 | 0 | 1 | | | |
| 2 | 0 | 0 | 1 | | |
| 3 | 0 | 0 | 0 | 1 | |

TABLE 4-continued

| synElVal | Binary sign string | | | | | | |
|---|---|---|---|---|---|---|---|
| 4 | 0 | 0 | 0 | 0 | 1 | | |
| 5 | 0 | 0 | 0 | 0 | 0 | 1 | |
| ... | 0 | 0 | 0 | 0 | 0 | 0 | ... |
| maxVal-1 | 0 | 0 | 0 | 0 | 0 | 0 | ... 1 |
| maxVal | 0 | 0 | 0 | 0 | 0 | 0 | ... 0 |
| binIdx | 0 | 1 | 2 | 3 | 4 | 5 | ... maxVal-1 |

TABLE 5

| synElVal | Binary sign string | | | | | | |
|---|---|---|---|---|---|---|---|
| 0 | 0 | | | | | | |
| 1 | 1 | 0 | | | | | |
| 2 | 1 | 1 | 0 | | | | |
| 3 | 1 | 1 | 1 | 0 | | | |
| 4 | 1 | 1 | 1 | 1 | 0 | | |
| 5 | 1 | 1 | 1 | 1 | 1 | 0 | |
| ... | 1 | 1 | 1 | 1 | 1 | 1 | ... |
| maxVal-1 | 1 | 1 | 1 | 1 | 1 | 1 | ... 0 |
| maxVal | 1 | 1 | 1 | 1 | 1 | 1 | ... 1 |
| binIdx | 0 | 1 | 2 | 3 | 4 | 5 | ... maxVal-1 |

The following table 6 shows a relationship between synElVal and a binary sign string in a fixed-length code whose length is len.

TABLE 6

| Value of synElVal | Binary sign string | | | | |
|---|---|---|---|---|---|
| 0 | 0 | 0 | ... | 0 | 0 |
| 1 | 0 | 0 | ... | 0 | 1 |
| 2 | 0 | 0 | ... | 1 | 0 |
| 3 | 0 | 0 | ... | 1 | 1 |
| ... | | | ... | | |
| $2^{len}-4$ | 1 | 1 | ... | 0 | 0 |
| $2^{len}-3$ | 1 | 1 | ... | 0 | 1 |
| $2^{len}-2$ | 1 | 1 | ... | 1 | 0 |
| $2^{len}-1$ | 1 | 1 | ... | 1 | 1 |
| binIdx | 0 | 1 | ... | len-2 | len-1 |

The following table 7 shows a table of k-order exponential-Golomb codes.

TABLE 7

| Order | Code word structure | CodeNum value range |
|---|---|---|
| k = 0 | 1 | 0 |
| | 0 1 $x_0$ | 1 to 2 |
| | 0 0 1 $x_1 x_0$ | 3 to 6 |
| | 0 0 0 1 $x_2 x_1 x_0$ | 7 to 14 |
| | ... | ... |
| k = 1 | 1 $x_0$ | 0 to 1 |
| | 0 1 $x_1 x_0$ | 2 to 5 |
| | 0 0 1 $x_2 x_1 x_0$ | 6 to 13 |
| | 0 0 0 1 $x_3 x_2 x_1 x_0$ | 14 to 29 |
| | ... | ... |
| k = 2 | 1 $x_1 x_0$ | 0 to 3 |
| | 0 1 $x_2 x_1 x_0$ | 4 to 11 |
| | 0 0 1 $x_3 x_2 x_1 x_0$ | 12 to 27 |
| | 0 0 0 1 $x_4 x_3 x_2 x_1 x_0$ | 28 to 59 |
| | ... | ... |
| k = 3 | 1 $x_2 x_1 x_0$ | 0 to 7 |
| | 0 1 $x_3 x_2 x_1 x_0$ | 8 to 23 |
| | 0 0 1 $x_4 x_3 x_2 x_1 x_0$ | 24 to 55 |
| | 0 0 0 1 $x_5 x_4 x_3 x_2 x_1 x_0$ | 56 to 119 |
| | ... | ... |

The following table 8 and table 9 show a relationship between synElVal and a binary sign string in two forms of unary codes.

TABLE 8

| synElVal | Binary sign string | | | | | |
|---|---|---|---|---|---|---|
| 0 | 1 | | | | | |
| 1 | 0 | 1 | | | | |
| 2 | 0 | 0 | 1 | | | |
| 3 | 0 | 0 | 0 | 1 | | |
| 4 | 0 | 0 | 0 | 0 | 1 | |
| 5 | 0 | 0 | 0 | 0 | 0 | 1 |
| ... | | | | | | |
| binIdx | 0 | 1 | 2 | 3 | 4 | 5 |

TABLE 9

| synElVal | Binary sign string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Video encoding methods provided in this disclosure are described below by using embodiments. The video encoding method corresponds to the video decoding method described in the above embodiment. For details not described in the video encoding method, reference may be made to the description in the video decoding method.

Figure 14:
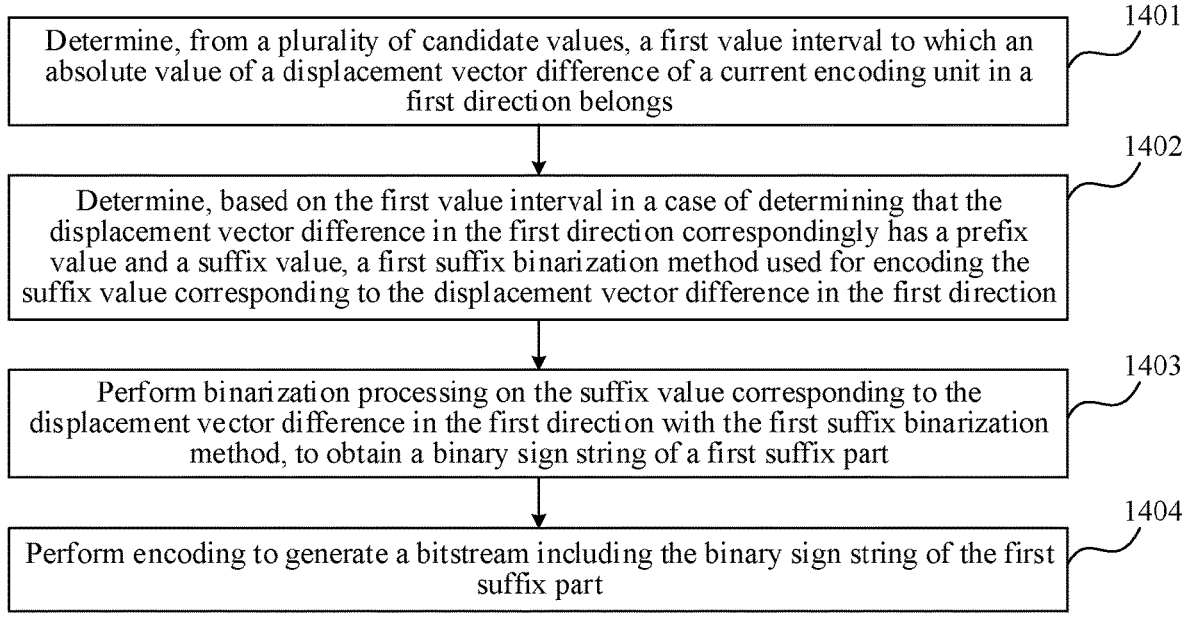
FIG. 14 is a flowchart of a video encoding method according to an embodiment of this disclosure.

FIG. 14 is a flowchart of a video encoding method according to an embodiment of this disclosure. The method may be applied to an encoder side device. The method may include the following steps (1401 to 1404):

Step 1401. Determine, from a plurality of candidate values, a first value interval to which an absolute value of a displacement vector difference of a current encoding unit in a first direction belongs. For example, a first value interval to which an absolute value of a displacement vector difference of a current encoding unit in a first direction belongs may be determined from among plural value intervals.

In an embodiment, the first direction is a horizontal direction or a vertical direction. The absolute value of the displacement vector difference of the current encoding unit in the first direction may be equal to 0, or may be greater than 0.

In an embodiment, a plurality of candidate value intervals are determined based on the plurality of candidate values, and the first value interval may be any one of the foregoing plurality of candidate value intervals. For example, the plurality of candidate values include 0, 5, 9, 17 and the like, and the plurality of candidate value intervals may be obtained based on the several values and include: [0, 5), [5, 9), [9, 17), and [17, co). The first value interval may be any one of the foregoing 4 candidate value intervals. For example, if the absolute value of the displacement vector difference in the first direction is 2, then the first value interval to which the absolute value belongs is [0, 5). In another example, if the absolute value of the displacement vector difference in the first direction is 10, then the first value interval to which the absolute value belongs is [9, 17).

In an embodiment, the plurality of candidate values (or the plurality of candidate value intervals) are set based on a distribution characteristic of the displacement vector difference. For different prediction modes, for example, an inter-frame prediction mode, an IBC prediction mode, an ISC prediction mode and the like, distribution characteristics of displacement vector differences are different. Therefore, when the technical solution of this disclosure is applied to a prediction mode, a plurality of candidate values (or a plurality of candidate value intervals) need to be set based on a distribution characteristic of a displacement vector difference in the prediction mode. For example, for the IBC prediction mode, most absolute values of the BVD are centralized in [0, 5), and then are distributed relatively flat in intervals [5, 9) and [9, 17). Then, for the IBC prediction mode, based on the foregoing distribution characteristic of the BVD, for example, the following 4 candidate value intervals may be set: [0, 5), [5, 9), [9, 17), and [17, co).

The displacement vector difference encoding and decoding method provided in this embodiment of this disclosure is not limited to being applicable to encoding and decoding of the BVD in the IBC prediction mode, and may be further applicable to encoding and decoding of the SVD in the ISC prediction mode, encoding and decoding of the MVD in the inter-frame prediction mode, and the like. This is not limited in this embodiment of this disclosure. Therefore, in a case that the current encoding unit belongs to an IBC encoding block, then the displacement vector difference is a BVD; in a case that the current encoding unit belongs to an ISC encoding block, then the displacement vector difference is an SVD; and in a case that the current encoding unit belongs to an encoding block in an inter-frame prediction mode, then the displacement vector difference is an MVD.

Step 1402. Determine, based on the first value interval in a case of determining that the displacement vector difference in the first direction correspondingly has a prefix value and a suffix value, a first suffix binarization method used for encoding the suffix value corresponding to the displacement vector difference in the first direction. For example, it may be determined, based on the first value interval, that the displacement vector difference in the first direction has a prefix value and a suffix value. Then, a first suffix encoding method for encoding the suffix value may be determined based on the first value interval.

In the current AVS3 standard, binarization and inverted binarization are performed on the prefix value corresponding to the displacement vector difference by using a truncated unary code whose truncated value is 3, and binarization and inverted binarization are performed on the suffix value corresponding to the displacement vector difference by using a 0-order exponential-Golomb code. That is, the prefix value and suffix value binarization and inverted binarization methods are both fixed methods.

Different from this, in this embodiment of this disclosure, binarization and inverted binarization methods for suffix values corresponding to displacement vector differences are methods determined based on value intervals to which absolute values of the displacement vector differences belong instead of fixed methods.

For example, in a case that the first value interval meets a first condition, it is determined that the first suffix binarization method used for encoding the suffix value corresponding to the displacement vector difference in the first direction is a first method; in a case that the first value interval meets a second condition, it is determined that the first suffix binarization method used for encoding the suffix value corresponding to the displacement vector difference in the first direction is a second method; and the first method and the second method are two different binarization methods, and are methods that are set based on distribution characteristics of the absolute value of the displacement vector differences in the value interval, are suitable for the distribution characteristics, and have relatively good encoding and decoding performance.

In an exemplary embodiment, it is determined, in a case that the first value interval meets a first condition, that the first suffix binarization method is a fixed-length code manner; and it is determined, in a case that the first value interval meets a second condition, that the first suffix binarization method is an exponential-Golomb code manner. Certainly, in some other examples, other different binarization methods may be further set correspondingly for the condition met by the value interval. This is not limited in this embodiment of this disclosure.

Step 1403. Perform binarization processing on the suffix value corresponding to the displacement vector difference in the first direction with the first suffix binarization method, to obtain a binary sign string of a first suffix part. For example, encoding processing may be performed on the suffix value corresponding to the displacement vector difference in the first direction using the first suffix encoding method, to obtain a first suffix part.

For example, in a case of determining that the first suffix binarization method is a fixed-length code manner, binarization processing is performed on the suffix value corresponding to the displacement vector difference in the first direction with the fixed-length code manner, to obtain a binary sign string of a first suffix part. The quantity of encoding bits of the fixed-length code may be a preset fixed value, or may be a value determined based on the first value interval.

In another example, in a case of determining that the first suffix binarization method is an exponential-Golomb code manner, binarization processing is performed on the suffix value corresponding to the displacement vector difference in the first direction with the exponential-Golomb code manner, to obtain a binary sign string of a first suffix part. The order of the exponential-Golomb code may be a preset fixed value, or may be a value determined based on the first value interval.

Step 1404. Perform encoding to generate a bitstream including the binary sign string of the first suffix part.

In a case that the displacement vector difference in the first direction correspondingly has a prefix value and a suffix value, the bitstream includes a binary sign string of the first prefix part and a binary sign string of the first suffix part. In a case that the displacement vector difference in the first direction correspondingly has only a prefix value, but has no suffix value, the bitstream includes a binary sign string (signed binary string) of the first prefix part. The binary sign string of the first prefix part is obtained by performing binarization processing on the prefix value corresponding to the displacement vector difference in the first direction with the first prefix binarization method. The binary sign string of the first suffix part is obtained in the foregoing manner described in step 1403.

The first prefix binarization method may be the truncated unary code manner. Binarization processing is performed on the prefix value corresponding to the displacement vector difference in the first direction with the truncated unary code manner, to obtain a binary sign string of a first prefix part.

Additionally, in a case that the absolute value of the displacement vector difference in the first direction is not 0, a sign of the displacement vector difference in the first direction needs to be encoded in the bitstream; and in a case that the absolute value of the displacement vector difference in the first direction is 0, a sign of the displacement vector difference in the first direction does not need to be encoded in the bitstream. The sign of the displacement vector difference may be indicated using a 1-bit flag. In an embodiment, the sign of the displacement vector difference is entropy-encoded in the CABAC manner, and has a corresponding context model; or is entropy-encoded in the bypass manner.

Additionally, the displacement vector difference usually includes components in such two directions as the horizontal direction and the vertical direction. The video encoding method provided in this disclosure may further include the following several steps (1405 to 1408, not shown in FIG. 14):

Step 1405. Determine, from a plurality of candidate values, a second value interval to which an absolute value of a displacement vector difference of a current coding unit in a second direction belongs.

Step 1406. Determine, based on the second value interval in a case of determining that the displacement vector difference in the second direction correspondingly has a prefix value and a suffix value, a second suffix binarization method used for encoding the suffix value corresponding to the displacement vector difference in the second direction.

In an embodiment, it is determined, in a case that the second value interval meets a first condition, that the second suffix binarization method is a fixed-length code manner; and it is determined, in a case that the second value interval meets a second condition, that the second suffix binarization method is an exponential-Golomb code manner.

Step 1407. Perform binarization processing on the suffix value corresponding to the displacement vector difference in the second direction with the second suffix binarization method, to obtain a binary sign string of a second suffix part.

Step 1408. Perform encoding to generate a bitstream including the binary sign string of the second suffix part.

The first direction is a horizontal direction and the second direction is a vertical direction; or the first direction is a vertical direction and the second direction is a horizontal direction.

In a case that the displacement vector difference in the second direction correspondingly has a prefix value and a suffix value, the bitstream includes a binary sign string of the second prefix part and a binary sign string of the second suffix part. In a case that the displacement vector difference in the second direction correspondingly has only a prefix value, but has no suffix value, the bitstream includes a binary sign string of the second prefix part. The binary sign string of the second prefix part is obtained by performing binarization processing on the prefix value corresponding to the displacement vector difference in the second direction with the second prefix binarization method. The binary sign string of the second suffix part is obtained in the foregoing manner described in step 1407.

The second prefix binarization method may be the truncated unary code manner. Binarization processing is performed on the prefix value corresponding to the displacement vector difference in the second direction with the truncated unary code manner, to obtain a binary sign string of a second prefix part.

Additionally, in a case that the absolute value of the displacement vector difference in the second direction is not 0, a sign of the displacement vector difference in the second direction needs to be encoded in the bitstream; and in a case that the absolute value of the displacement vector difference in the second direction is 0, a sign of the displacement vector difference in the second direction does not need to be encoded in the bitstream.

In an exemplary embodiment, if entropy coding and entropy decoding are performed on the prefix value corresponding to the displacement vector difference in the second direction with CABAC, a first bit of the prefix value corresponding to the displacement vector difference in the second direction has a first context model and a second context model. In a case that the displacement vector difference in the first direction is first encoded and the displacement vector difference in the second direction is then encoded, the first context model is entropy-coded based on the value of the first bit if the displacement vector difference in the first direction is 0; and the second context model is entropy-coded based on the value of the first bit if the displacement vector difference in the first direction is not 0.

In the embodiments of this disclosure, a probability that the displacement vector difference in the vertical direction (y direction) is 0 if the displacement vector difference in the horizontal direction (x direction) is 0 is relatively high. Therefore, for the displacement vector difference in the vertical direction (y direction), a relatively fine context model is established, that is, two context models are added to the first bit (if the value of the first bit is 0, it indicates that the displacement vector difference in the vertical direction is 0) of the prefix value, and one of the foregoing two context models which is used is determined according to whether the displacement vector difference in the horizontal direction is 0. Through this manner, the quantity of context models may be increased to achieve finer conditional estimation, thereby improving encoding and decoding efficiency.

To sum up, in the technical solution provided in this embodiment of this disclosure, binarization and inverted binarization methods for suffix values corresponding to displacement vector differences are methods determined based on value intervals to which absolute values of the displacement vector differences belong instead of fixed methods. Through this manner, based on distribution characteristics of the absolute values of the displacement vector differences in different value intervals, the binarization and inverted binarization methods that are suitable for the distribution characteristics and have relatively good encoding and decoding performance are designed, thereby facilitating improvement in encoding and decoding efficiency and compression performance.

Additionally, to enable the decoder side device to learn, in the decoding process, the value interval to which the absolute value of the displacement vector difference belongs, and then select, based on the value interval, a corresponding inverted binarization method to perform inverted binarization processing on the suffix value, the encoder side device needs to encode related information used for determining the foregoing value interval into the bitstream in the encoding process, so that the decoder side device can obtain the foregoing related information from the bitstream, and then perform decoding to obtain the value interval to which the absolute value of the displacement vector difference belongs.

A description is mainly made below using the process of encoding the displacement vector difference in the first direction as an example, and the process of encoding the displacement vector difference in the second direction is the same as or similar to the process of encoding the displacement vector difference in the first direction, and is not described in detail.

In an example, in a case that the decoder side device determines, based on the prefix value corresponding to the displacement vector difference in the first direction, the first value interval using the method provided in the embodiment in FIG. 10, the encoder side device first determines, from the plurality of candidate values (or the plurality of candidate value intervals), the first value interval to which the absolute value of displacement vector difference of the current coding unit in the first direction belongs; and then obtains, based on a preset mapping relationship between a value interval and a prefix value, the prefix value corresponding to the first value interval, and then encodes the prefix value into the bitstream.

In another example, in a case that the decoder side device determines, based on a range identifier (for example, the first range identifier), the first value interval using the method provided in the embodiment in FIG. 12, the encoder side device first determines, from the plurality of candidate values (or the plurality of candidate value intervals), the first value interval to which the absolute value of displacement vector difference of the current coding unit in the first direction belongs; and then determines a value of the range identifier, and then encodes the range identifier into the bitstream.

In still another example, in a case that the decoder side device determines, with reference to a prefix value and a range identifier (for example, the second range identifier or the third range identifier), the first value interval using the method provided in the embodiment in FIG. 11 or FIG. 13, the encoder side device first determines, from the plurality of candidate values (or the plurality of candidate value intervals), the first value interval to which the absolute value of displacement vector difference of the current coding unit in the first direction belongs; and then determines a prefix value and a value of a range identifier, and then encodes the prefix value and the range identifier into the bitstream respectively.

Additionally, both the prefix value and the range identifier may be entropy-coded in the CABAC manner or entropy-coded in the bypass manner. This is not limited in this embodiment of this disclosure.

The following is an apparatus embodiment of this disclosure, which can be used to perform the method embodiments of this disclosure. For details not disclosed in the apparatus embodiments of this disclosure, reference is made to the method embodiments of this disclosure.

Figure 15:
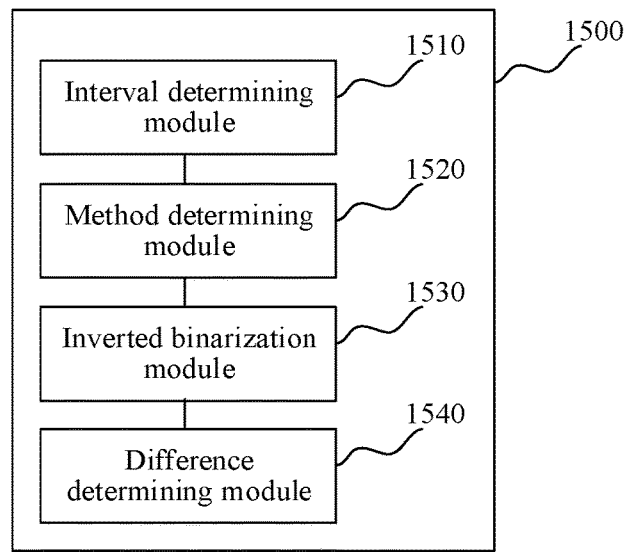
FIG. 15 is a block diagram of a video decoding apparatus according to an embodiment of this disclosure.

FIG. 15 is a block diagram of a video decoding apparatus according to an embodiment of this disclosure. The apparatus has a function of realizing the example of the foregoing video decoding method, and the function may be realized by hardware or by hardware executing corresponding software. The apparatus may be the decoder side device described above, or may be disposed on the decoder side device. The apparatus 1500 may include: an interval determining module 1510, a method determining module 1520, an inverted binarization module 1530 and a difference determining module 1540.

The interval determining module 1510 is configured to determine, from a plurality of candidate values, a first value interval to which an absolute value of a displacement vector difference of a current decoding unit in a first direction belongs.

The method determining module 1520 is configured to determine, based on the first value interval in a case of determining that the displacement vector difference in the first direction correspondingly has a prefix value and a suffix value, a first suffix inverted binarization method used for decoding the suffix value corresponding to the displacement vector difference in the first direction.

The inverted binarization module 1530 is configured to perform inverted binarization processing on a binary sign string of a first suffix part in a bitstream with the first suffix inverted binarization method, to obtain the suffix value corresponding to the displacement vector difference in the first direction.

The difference determining module 1540 is configured to determine, based on the prefix value and the suffix value corresponding to the displacement vector difference in the first direction, the displacement vector difference in the first direction.

In an exemplary embodiment, the interval determining module 1510 is configured to:
perform inverted binarization processing on a binary sign string of a first prefix part in the bitstream with a first prefix inverted binarization method, to obtain the prefix value corresponding to the displacement vector difference in the first direction; and
determine, based on the prefix value corresponding to the displacement vector difference in the first direction, the first value interval from the plurality of candidate values.

In an exemplary embodiment, the interval determining module 1510 is configured to:
decode the bitstream to obtain a first range identifier, where the first range identifier is used for indicating whether the absolute value of the displacement vector difference in the first direction belongs to a first setting range; and
determine, based on the first range identifier, the first value interval from the plurality of candidate values.

In an exemplary embodiment, the interval determining module 1510 is configured to:
perform inverted binarization processing on a binary sign string of a first prefix part in the bitstream with a first prefix inverted binarization method, to obtain the prefix value corresponding to the displacement vector difference in the first direction; and
determine, based on the prefix value corresponding to the displacement vector difference in the first direction in a case that the prefix value corresponding to the displacement vector difference in the first direction belongs to a first value range, the first value interval from the plurality of candidate values; and
decode, in a case that the prefix value corresponding to the displacement vector difference in the first direction belongs to a second value range, the bitstream to obtain a second range identifier, where the second range identifier is used for indicating whether the absolute value of the displacement vector difference in the first direction belongs to a second setting range; and determine, based on the second range identifier, the first value interval from the plurality of candidate values.

In an exemplary embodiment, the interval determining module 1510 is configured to:
decode the bitstream to obtain a third range identifier, where the third range identifier is used for indicating whether the absolute value of the displacement vector difference in the first direction belongs to a third setting range;
determine, based on the third setting range in a case of determining based on the third range identifier that the absolute value of the displacement vector difference of the current decoding unit in the first direction belongs to the third setting range, the first value interval; and
perform, in a case of determining based on the third range identifier that the absolute value of the displacement vector difference of the current decoding unit in the first direction does not belong to the third setting range, inverted binarization processing on a binary sign string of a first prefix part in the bitstream with a first prefix inverted binarization method, to obtain the prefix value corresponding to the displacement vector difference in the first direction; and determine, based on the prefix value corresponding to the displacement vector difference in the first direction, the first value interval from the plurality of candidate values.

In an exemplary embodiment, the interval determining module 1510 is configured to perform inverted binarization processing on a binary sign string of a first prefix part in the bitstream with a truncated unary code manner, to obtain the prefix value corresponding to the displacement vector difference in the first direction.

In an exemplary embodiment, the method determining module 1520 is configured to:
determine, in a case that the first value interval meets a first condition, that the first suffix inverted binarization method is a fixed-length code manner; and
determine, in a case that the first value interval meets a second condition, that the first suffix inverted binarization method is an exponential-Golomb code manner.

In an exemplary embodiment, the current decoding unit belongs to an IBC decoding block, and the displacement vector difference is a BVD; or the current decoding unit belongs to an ISC decoding block, and the displacement vector difference is an SVD; or the current decoding unit belongs to a decoding block in an inter-frame prediction mode, and the displacement vector difference is an MVD.

In an exemplary embodiment, the plurality of candidate values are set based on a distribution characteristic of the displacement vector difference.

In an exemplary embodiment, the interval determining module 1510 is further configured to determine, from a plurality of candidate values, a second value interval to which an absolute value of a displacement vector difference of a current decoding unit in a second direction belongs.

The method determining module 1520 is further configured to determine, based on the second value interval in a case of determining that the displacement vector difference in the second direction correspondingly has a prefix value and a suffix value, a second suffix inverted binarization method used for decoding the suffix value corresponding to the displacement vector difference in the second direction.

The inverted binarization module 1530 is further configured to perform inverted binarization processing on a binary sign string of a second suffix part in a bitstream with the second suffix inverted binarization method, to obtain the suffix value corresponding to the displacement vector difference in the second direction.

The difference determining module 1540 is further configured to determine, based on the prefix value and the suffix value corresponding to the displacement vector difference in the second direction, the displacement vector difference in the second direction.

The first direction is a horizontal direction and the second direction is a vertical direction; or the first direction is a vertical direction and the second direction is a horizontal direction.

In an exemplary embodiment, entropy coding and entropy decoding are performed on the prefix value corresponding to the displacement vector difference in the second direction with CABAC, and a first bit of the prefix value corresponding to the displacement vector difference in the second direction has a first context model and a second context model. In a case that the displacement vector difference in the first direction is first decoded and the displacement vector difference in the second direction is then decoded, the interval determining module 1510 is further configured to:
determine, based on the first context model in a case that the displacement vector difference in the first direction is 0, a value of the first bit; and determine, based on the second context model in a case that the displacement vector difference in the first direction is not 0, a value of the first bit.

Figure 16:
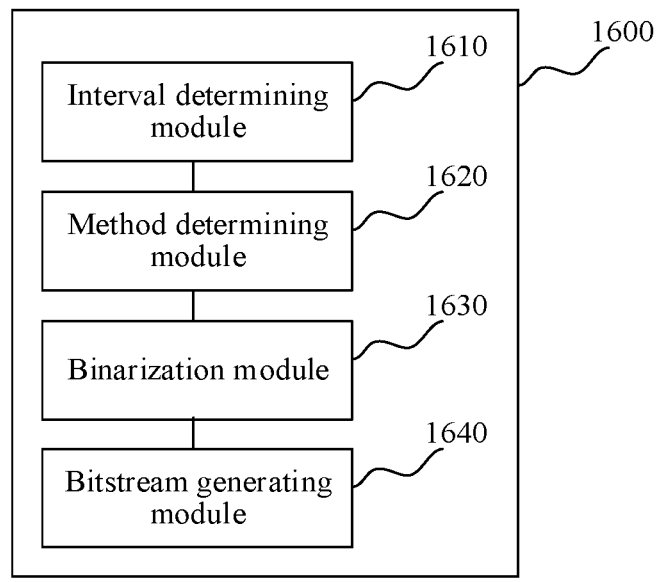
FIG. 16 is a block diagram of a video encoding apparatus according to an embodiment of this disclosure.

FIG. 16 is a block diagram of a video encoding apparatus according to an embodiment of this disclosure. The apparatus has a function of realizing the example of the foregoing video encoding method, and the function may be realized by hardware or by hardware executing corresponding software. The apparatus may be the encoder side device described above, or may be disposed on the encoder side device. The apparatus 1600 may include: an interval determining module 1610, a method determining module 1620, a binarization module 1630 and a bitstream generating module 1640.

The interval determining module 1610 is configured to determine, from a plurality of candidate values, a first value interval to which an absolute value of a displacement vector difference of a current encoding unit in a first direction belongs.

The method determining module 1620 is configured to determine, based on the first value interval in a case of determining that the displacement vector difference in the first direction correspondingly has a prefix value and a suffix value, a first suffix binarization method used for encoding the suffix value corresponding to the displacement vector difference in the first direction.

The binarization module 1630 is configured to perform binarization processing on the suffix value corresponding to the displacement vector difference in the first direction with the first suffix binarization method, to obtain a binary sign string of a first suffix part.

The bitstream generating module 1640 is configured to perform encoding to generate a bitstream including the binary sign string of the first suffix part.

When the apparatus provided in the foregoing embodiment implements the functions of the apparatus, the division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to the same conception. For the specific implementation process, reference may be made to the method embodiments, and details are not described herein again.

Figure 17:
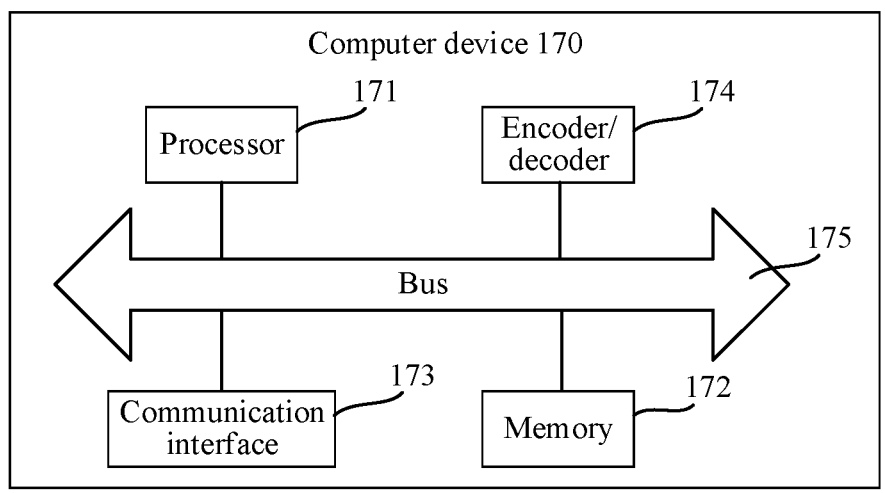
FIG. 17 is a structural block diagram of a computer device according to an embodiment of this disclosure.

FIG. 17 is a schematic block diagram of a computer device according to an embodiment of this disclosure. The computer device may be the decoder side device or the encoder side device described above. The computer device 170 may include: a processor 171 (including processing circuitry), a memory 172 (including a non-transitory computer-readable storage medium), a communication interface 173, an encoder/decoder 174, and a bus 175.

The processor 171 includes one or more processing cores, and the processor 171 performs various functional applications and information processing by running a software program and module.

The memory 172 may be configured to store a computer program. The processor 171 is configured to execute the computer program, to implement the foregoing video decoding method, or implement the foregoing video encoding method.

In an embodiment, a non-transitory computer-readable storage medium stores computer-readable instructions which, when executed by a computer device, cause the computer device to perform a video decoding method includes determining, from among plural value intervals, a first value interval to which an absolute value of a displacement vector difference of a current decoding unit in a first direction belongs. The method further includes determining, based on the first value interval, that the displacement vector difference in the first direction has a prefix value and a suffix value, and determining, based on the first value interval, a first suffix decoding method for decoding the suffix value. The method further includes performing inverted binarization processing on a first suffix part in a bitstream using the determined first suffix decoding method, to obtain the suffix value corresponding to the displacement vector difference in the first direction. The method further includes determining, based on the prefix value and the suffix value, the displacement vector difference in the first direction.

In an embodiment, a non-transitory computer-readable storage medium stores computer-readable instructions which, when executed by a computer device, cause the computer device to perform a video encoding method includes determining, from among plural value intervals, a first value interval to which an absolute value of a displacement vector difference of a current encoding unit in a first direction belongs. The method further includes determining, based on the first value interval, that the displacement vector difference in the first direction has a prefix value and a suffix value, and determining, based on the first value interval, a first suffix encoding method for encoding the suffix value. The method further includes performing binarization processing on the suffix value corresponding to the displacement vector difference in the first direction using the first suffix encoding method, to obtain a first suffix part, and performing encoding to generate a bitstream comprising the first suffix part.

The communication interface 173 may be configured to communicate with other devices, for example, receiving/transmitting audio and video data.

The encoder/decoder 174 may be configured to implement encoding and decoding functions, for example, encoding and decoding audio and video data.

The memory 172 is connected to the processor 171 through the bus 175.

In addition, the memory 172 may be implemented by any type of volatile or non-volatile storage device or a combination thereof. The volatile or non-volatile storage device includes, but not limited to: a magnetic disk, an optical disc, an electrically-erasable programmable read-only memory (EEPROM), an erasable programmable read-only memory (EPROM), a static random access memory (SRAM), a read only memory (ROM), a magnetic memory, a flash memory, or a programmable read-only memory (PROM).

A person skilled in the art may understand that the structure shown in FIG. 17 does not constitute any limitation on the computer device 170, and the computer device may include more components or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing video decoding method, or implement the foregoing video encoding method.

The computer-readable storage medium may include: a read-only memory (ROM), a RAM, a solid state drive (SSD), an optical disc, or the like. The RAM may include a resistance random access memory (ReRAM) and a dynamic random access memory (DRAM).

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium, and executes the computer instructions, to cause the computer device to implement the foregoing video decoding method, or implement the foregoing video encoding method.

It is to be understood that "plurality of" mentioned in this specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A video decoding method, performed by a processor, the method comprising:
    determining, from among plural value intervals, a first value interval to which an absolute value of a displacement vector difference of a current decoding unit in a first direction belongs;
    determining, based on the first value interval, that the displacement vector difference in the first direction has a prefix value and a suffix value;
    determining, based on the first value interval, a first type of suffix decoding method from a plurality of different types of suffix decoding methods for decoding the suffix value, each of the plurality of different types of suffix decoding methods being associated with a respective one of the plural value intervals, the plurality of different types of suffix decoding methods including the first type of suffix decoding method associated with the first value interval and a second type of suffix decoding method associated with a second value interval of the plural value intervals;
    performing decoding processing on a first suffix part in a bitstream using the determined first type of suffix decoding method, to obtain the suffix value corresponding to the displacement vector difference in the first direction; and
    determining, based on the prefix value and the suffix value, the displacement vector difference in the first direction.

2. The method according to claim 1, wherein the determining the first value interval comprises:
    performing decoding processing on a first prefix part in the bitstream, to obtain the prefix value corresponding to the displacement vector difference in the first direction; and
    determining, based on the prefix value, the first value interval among the plural value intervals.

3. The method according to claim 2, wherein the performing decoding processing on the first prefix part in the bitstream comprises:
    performing the decoding processing on a signed binary string of the first prefix part in the bitstream using a truncated unary code method, to obtain the prefix value corresponding to the displacement vector difference in the first direction.

4. The method according to claim 1, wherein the determining the first value interval comprises:
    performing decoding processing on a first prefix part in the bitstream, to obtain the prefix value corresponding to the displacement vector difference in the first direction; and
    when the prefix value is in a first value range, determining the first value interval based on the prefix value; and
    when the prefix value is in a second value range,
        decoding the bitstream to obtain a second range identifier, wherein the second range identifier indicates whether the absolute value of the displacement vector difference in the first direction is in a second range; and
        determining, based on the second range identifier, the first value interval among the plural value intervals.

5. The method according to claim 1, wherein the determining the first value interval comprises:
    decoding the bitstream to obtain a third range identifier, wherein the third range identifier indicates whether the absolute value of the displacement vector difference in the first direction is in a third range;
    when the third range identifier indicates that the absolute value of the displacement vector difference in the first direction is in the third range, determining the first value interval based on the third range; and
    when the third range identifier indicates that the absolute value of the displacement vector difference in the first direction is not in the third range,
        performing decoding processing on a first prefix part in the bitstream, to obtain the prefix value corresponding to the displacement vector difference in the first direction; and
        determining, based on the prefix value, the first value interval among the plural value intervals.

6. The method according to claim 1, wherein the determining the first type of suffix decoding method comprises:
    when the first value interval meets a first condition, determining that the first type of suffix decoding method is a fixed-length code decoding method; and
    when the first value interval meets a second condition, determining that the first type of suffix decoding method is an exponential-Golomb decoding method.

7. The method according to claim 1, wherein
the current decoding unit corresponds to an intra block copy (IBC) decoding block, and the displacement vector difference is a block vector difference (BVD); or
the current decoding unit corresponds to an intra string copy (ISC) decoding block, and the displacement vector difference is a string vector difference (SVD); or
the current decoding unit corresponds to a decoding block in an inter-frame prediction mode, and the displacement vector difference is a motion vector difference (MVD).

8. The method according to claim 1, wherein the plural value intervals are set based on a distribution characteristic of the displacement vector difference.

9. The method according to claim 1, further comprising:
determining, from the plural value intervals, the second value interval, to which an absolute value of a displacement vector difference of the current decoding unit in a second direction belongs;
determining, based on the second value interval, that the displacement vector difference in the second direction has a prefix value and a suffix value;
determining, based on the second value interval, the second type of suffix decoding method for decoding the suffix value of the displacement vector difference in the second direction;
performing decoding processing on a second suffix part in the bitstream using the determined second type of suffix decoding method, to obtain the suffix value corresponding to the displacement vector difference in the second direction; and
determining, based on the prefix value and the suffix value corresponding to the displacement vector difference in the second direction, the displacement vector difference in the second direction, wherein
(i) the first direction is a horizontal direction and the second direction is a vertical direction; or (ii) the first direction is the vertical direction and the second direction is the horizontal direction.

10. The method according to claim 9, wherein
the prefix value corresponding to the displacement vector difference in the second direction is entropy coded with context-based adaptive binary arithmetic coding (CABAC), and a first bit of the prefix value corresponding to the displacement vector difference in the second direction has a first context model and a second context model; and
when the displacement vector difference in the first direction is decoded first and the displacement vector difference in the second direction is decoded second, the method further comprises:
when the displacement vector difference in the first direction is 0, determining a value of the first bit of the prefix value corresponding to the displacement vector difference in the second direction according to the first context model; and
when the displacement vector difference in the first direction is not 0, determining the value of the first bit of the prefix value corresponding to the displacement vector difference in the second direction according to the second context model.

11. The method according to claim 1, wherein the determining, based on the prefix value and the suffix value, the displacement vector difference in the first direction comprises:
determining, based on the prefix value corresponding to the displacement vector difference in the first direction, a first offset value;
determining, based on the first offset value and the suffix value corresponding to the displacement vector difference in the first direction, the absolute value of the displacement vector difference in the first direction;
when the absolute value of the displacement vector difference in the first direction is not 0, decoding the bitstream to obtain a sign of the displacement vector difference in the first direction, and determining, based on the absolute value of the displacement vector difference in the first direction and the sign, the displacement vector difference in the first direction; and
when the absolute value of the displacement vector difference in the first direction is 0, determining that the displacement vector difference in the first direction is 0 without decoding the bitstream to obtain the sign of the displacement vector difference in the first direction.

12. The method according to claim 1, wherein the determining the first value interval comprises:
decoding, from the bitstream, a first range identifier, wherein the first range identifier indicates whether the absolute value of the displacement vector difference in the first direction is in a first range; and
determining, based on the first range identifier, the first value interval among the plural value intervals.

13. A video encoding method, comprising:
determining, from among plural value intervals, a first value interval to which an absolute value of a displacement vector difference of a current encoding unit in a first direction belongs;
determining, based on the first value interval, that the displacement vector difference in the first direction has a prefix value and a suffix value;
determining, based on the first value interval, a first type of suffix encoding method from a plurality of different types of suffix encoding methods for encoding the suffix value, each of the plurality of different types of suffix encoding methods being associated with a respective one of the plural value intervals, the plurality of different types of suffix encoding methods including the first type of suffix encoding method associated with the first value interval and a second type of suffix encoding method associated with a second value interval of the plural value intervals;
performing encoding processing on the suffix value corresponding to the displacement vector difference in the first direction using the first suffix encoding method, to obtain a first suffix part; and
performing encoding to generate a bitstream comprising the first suffix part.

14. A video decoding apparatus, comprising:
processing circuitry configured to:
determine, from among plural value intervals, a first value interval to which an absolute value of a displacement vector difference of a current decoding unit in a first direction belongs;
determine, based on the first value interval, that the displacement vector difference in the first direction has a prefix value and a suffix value;
determine, based on the first value interval, a first type of suffix decoding method from a plurality of different types of suffix decoding methods for decoding the suffix value, each of the plurality of different types of suffix decoding methods being associated with a respective one of the plural value intervals, the plurality of different types of suffix decoding methods including the first type of suffix decoding method associated with the first value interval and a second type of suffix decoding method associated with a second value interval of the plural value intervals;

perform decoding processing on a first suffix part in the a bitstream using the first type of suffix decoding method, to obtain the suffix value corresponding to the displacement vector difference in the first direction; and determine, based on the prefix value and the suffix value, the displacement vector difference in the first direction.

15. The apparatus according to claim 14, wherein the processing circuitry is further configured to:

perform decoding processing on a first prefix part in the bitstream, to obtain the prefix value corresponding to the displacement vector difference in the first direction; and determine, based on the prefix value, the first value interval among the plural value intervals.

16. The apparatus according to claim 15, wherein the processing circuitry is further configured to:

perform the decoding processing on a signed binary string of the first prefix part in the bitstream using a truncated unary code method, to obtain the prefix value corresponding to the displacement vector difference in the first direction.

17. The apparatus according to claim 14, wherein the processing circuitry is further configured to:

perform decoding processing on a first prefix part in the bitstream, to obtain the prefix value corresponding to the displacement vector difference in the first direction; and when the prefix value is in a first value range, determine the first value interval based on the prefix value; and when the prefix value belongs to a second value range, decode the bitstream to obtain a second range identifier, wherein the second range identifier indicates whether the absolute value of the displacement vector difference in the first direction belongs to a second range; and determine, based on the second range identifier, the first value interval among the plural value intervals.

18. The apparatus according to claim 14, wherein the processing circuitry is further configured to:

decode the bitstream to obtain a third range identifier, wherein the third range identifier indicates whether the absolute value of the displacement vector difference in the first direction is in a third range;

when the third range identifier indicates that the absolute value of the displacement vector difference in the first direction is in the third range, determine the first value interval based on the third range; and when the third range identifier indicates that the absolute value of the displacement vector difference in the first direction is not in the third range, perform decoding processing on a first prefix part in the bitstream, to obtain the prefix value corresponding to the displacement vector difference in the first direction; and determine, based on the prefix value, the first value interval among the plural value intervals.

19. The apparatus according to claim 14, wherein the processing circuitry is further configured to:

when the first value interval meets a first condition, determine that the first type of suffix decoding method is a fixed-length code decoding method; and when the first value interval meets a second condition, determine that the first type of suffix decoding method is an exponential-Golomb decoding method.

20. The apparatus according to claim 14, wherein the processing circuitry is further configured to:

decode, from the bitstream, a first range identifier, wherein the first range identifier indicates whether the absolute value of the displacement vector difference in the first direction is in a first range; and determine, based on the first range identifier, the first value interval among the plural value intervals.

* * * * *